United States Patent
Itakura et al.

(10) Patent No.: US 10,203,930 B2
(45) Date of Patent: Feb. 12, 2019

(54) DISPLAY METHOD AND DISPLAY CONTROL APPARATUS

(71) Applicant: FUJITSU LIMITED, Kawasaki-shi, Kanagawa (JP)

(72) Inventors: Kota Itakura, Kawasaki (JP); Naoki Nishiguchi, Kawasaki (JP); Akira Fujii, Machida (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 15/707,214

(22) Filed: Sep. 18, 2017

(65) Prior Publication Data
US 2018/0004475 A1    Jan. 4, 2018

Related U.S. Application Data

(63) Continuation of application No. PCT/JP2015/058187, filed on Mar. 19, 2015.

(51) Int. Cl.
*G06F 3/14* (2006.01)
*G09G 5/14* (2006.01)
*G09G 5/00* (2006.01)

(52) U.S. Cl.
CPC ............ *G06F 3/1446* (2013.01); *G09G 5/006* (2013.01); *G09G 5/14* (2013.01); *G09G 2340/04* (2013.01);
(Continued)

(58) Field of Classification Search
CPC .. G06F 1/1641; G06F 3/0481; G06F 3/04845; G06F 3/1423; G06F 3/1431;
(Continued)

(56) References Cited

U.S. PATENT DOCUMENTS

| 5,784,035 A * | 7/1998 | Hagiwara | G06F 3/1446 345/1.3 |
| 2004/0255243 A1 * | 12/2004 | Vincent, III | G06F 17/2247 713/170 |

(Continued)

FOREIGN PATENT DOCUMENTS

| JP | 2003-271985 | 9/2003 |
| JP | 2003-280623 | 10/2003 |

(Continued)

OTHER PUBLICATIONS

International Search Report dated May 12, 2015 in PCT/JP2015/058187 filed Mar. 19, 2015.
(Continued)

*Primary Examiner* — Sae Won Yoon
(74) *Attorney, Agent, or Firm* — Oblon, McClelland, Maier & Neustadt, L.L.P.

(57) ABSTRACT

In this display method, an information processing apparatus converts, for each of plural display surfaces that are parts of an entire screen, a position and size of a window in a coordinate system of the entire screen into a position and size of the window in a coordinate system of the display surface according to arrangement of the plural display surfaces, and transmits, for each of the plural display surfaces, the position and the size of the window in the coordinate system of the display surface to a display control apparatus that has a display device that provides the display surface. And each of plural display control apparatuses receives contents data from a terminal, and displays an image rendered based on the received contents data according to the received position and size of the window in the coordinate system of a display surface of the display control apparatus.

4 Claims, 26 Drawing Sheets

(52) U.S. Cl.
CPC ... *G09G 2358/00* (2013.01); *G09G 2370/022* (2013.01)

(58) Field of Classification Search
CPC ...... G06F 3/1446; G06F 3/1454; G06F 3/147; G09G 2300/026; G02F 1/13336
USPC .......................................... 345/581, 1.1, 1.3
See application file for complete search history.

(56) References Cited

U.S. PATENT DOCUMENTS

| | | | |
|---|---|---|---|
| 2008/0211825 A1 | 9/2008 | Sunakawa et al. | |
| 2009/0027302 A1* | 1/2009 | Li | G06F 3/1423 345/1.1 |
| 2009/0248914 A1* | 10/2009 | Choi | H04N 5/765 710/33 |
| 2010/0123732 A1* | 5/2010 | Jenks | G06F 3/1446 345/592 |
| 2012/0054835 A1* | 3/2012 | Oda | G06F 13/385 726/4 |
| 2012/0179743 A1* | 7/2012 | Sullivan | G06F 17/30861 709/203 |
| 2013/0002688 A1* | 1/2013 | Zhu | G06F 3/1446 345/502 |
| 2014/0009422 A1 | 1/2014 | Arigaya | |

FOREIGN PATENT DOCUMENTS

| | | |
|---|---|---|
| JP | 2005-301131 | 10/2005 |
| JP | 2006-284990 | 10/2006 |
| JP | 2008-096746 | 4/2008 |
| JP | 2012-169739 | 9/2012 |
| JP | 2013-54658 | 3/2013 |
| JP | 2014-178659 | 9/2014 |

OTHER PUBLICATIONS

Written Opinion dated May 12, 2015 in PCT/JP2015/058187 filed Mar. 19, 2015 (with English Translation).
Office Action dated Jun. 19, 2018 in Japanese Patent Application No. 2017-505969, citing document AO therein, with English-language translation, 9 pages.
Office Action dated Dec. 4, 2018 in Japanese Patent Application No. 2017-505969, with English-language translation, 10 pages.

* cited by examiner

| ID OF DISPLAY CONTROL APPARATUS | IP ADDRESS | POSITION OF ORIGIN (X COORDINATE, Y COORDINATE) |
|---|---|---|
| D1 | xxx.xxx.xxx.1 | (0, 0) |
| D2 | xxx.xxx.xxx.2 | (2000, 0) |

| WINDOW ID | AUTHENTICATION KEY |
|---|---|
| W1 | xxxx |
| ⋮ | ⋮ |

| WINDOW ID | | W1 | |
|---|---|---|---|
| FRAME DATA | POSITION (X COORDINATE, Y COORDINATE) | SIZE (WIDTH, HEIGHT) | DISPLAY ANGLE |
| GLOBAL COORDINATE SYSTEM | (1000, 500) | (2000, 2000) | 0 |
| DISPLAY COORDINATE SYSTEM OF FIRST DISPLAY CONTROL APPARATUS | (1000, 500) | (2000, 2000) | 0 |
| DISPLAY COORDINATE SYSTEM OF SECOND DISPLAY CONTROL APPARATUS | (-1000, 500) | (2000, 2000) | 0 |

FIG.17

| WINDOW ID | AUTHENTICATION KEY | POSITION (X COORDINATE, Y COORDINATE) | SIZE (WIDTH, HEIGHT) | DISPLAY ANGLE |
|---|---|---|---|---|
| W1 | xxxx | (1000, 500) | (2000, 2000) | 0 |
| ... | ... | ... | ... | ... |

FIG.26

| WINDOW ID | CONTENTS DATA | |
|---|---|---|
| | HTML FILE | CSS FILE |
| W1 | a.html | a.css |
| ... | ... | ... |

FIG.27

DISPLAY METHOD AND DISPLAY CONTROL APPARATUS

CROSS-REFERENCE TO RELATED APPLICATIONS

This application is a continuing application, filed under 35 U.S.C. section 111(a), of International Application PCT/JP2015/058187, filed on Mar. 19, 2015, the entire contents of which are incorporated herein by reference.

FIELD

This invention relates to a multi-display technique.

BACKGROUND

A certain patent document discloses a multi-display technique for dividing an image generated on a user terminal and outputting data of divided images on plural display devices to cause a large screen using the plural display devices to display the image.

In this example, a processing load on the user terminal becomes excessive, and there is an aspect that it is difficult to apply to a user terminal with low processing performance. In other words, there is no technique for distributing loads relating to contents display processing in a multi-display system.

Patent Document 1: Japanese Laid-open Patent Publication No. 2006-284990

Patent Document 2: Japanese Laid-open Patent Publication No. 2003-271985

SUMMARY

A display method relating to one aspect includes: converting, by using an information processing apparatus and for each of plural display surfaces that are parts of an entire screen, a position and size of a window in a coordinate system of the entire screen into a position and size of the window in a coordinate system of the display surface according to arrangement of the plural display surfaces; transmitting, by using the information processing apparatus and for each of the plural display surfaces, the position and the size of the window in the coordinate system of the display surface to a display control apparatus that has a display device that provides the display surface; receiving, by using each of plural display control apparatuses, contents data from a terminal; and displaying, by using each of the plural display control apparatuses, an image rendered based on the received contents data according the received position and size of the window in the coordinate system of a display surface of the display control apparatus.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 17 is a diagram depicting an example of a frame table;

FIG. 26 is a diagram depicting an example of first received data;

FIG. 27 is a diagram depicting an example of second received data;

DESCRIPTION OF EMBODIMENTS

Embodiment 1

Figure 1:
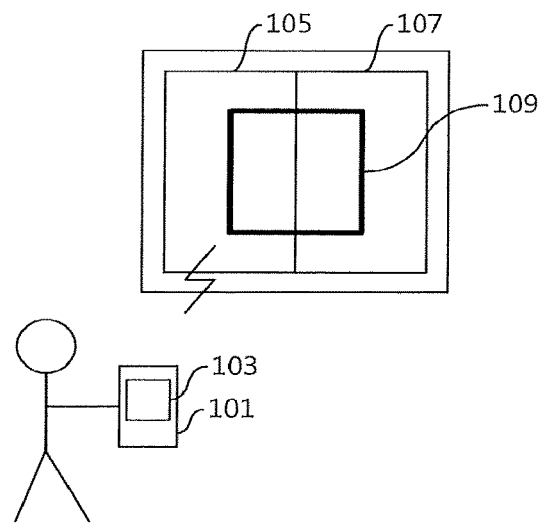
FIG. 1 is a diagram depicting an outline of a multi-display system relating to this embodiment.

FIG. 1 illustrates an overview of a multi-display system relating to this embodiment. In this example, based on contents data 103 transmitted from a client terminal 101 held by a user, a contents image 109 is displayed on an entire screen on which a left display surface 105 and a right display surface 107 are arranged. In this example, an example in which display surfaces are arranged horizontally, but the display surfaces may be arranged vertically. Moreover, the display surfaces may be arranged in a matrix pattern.

Figure 2:
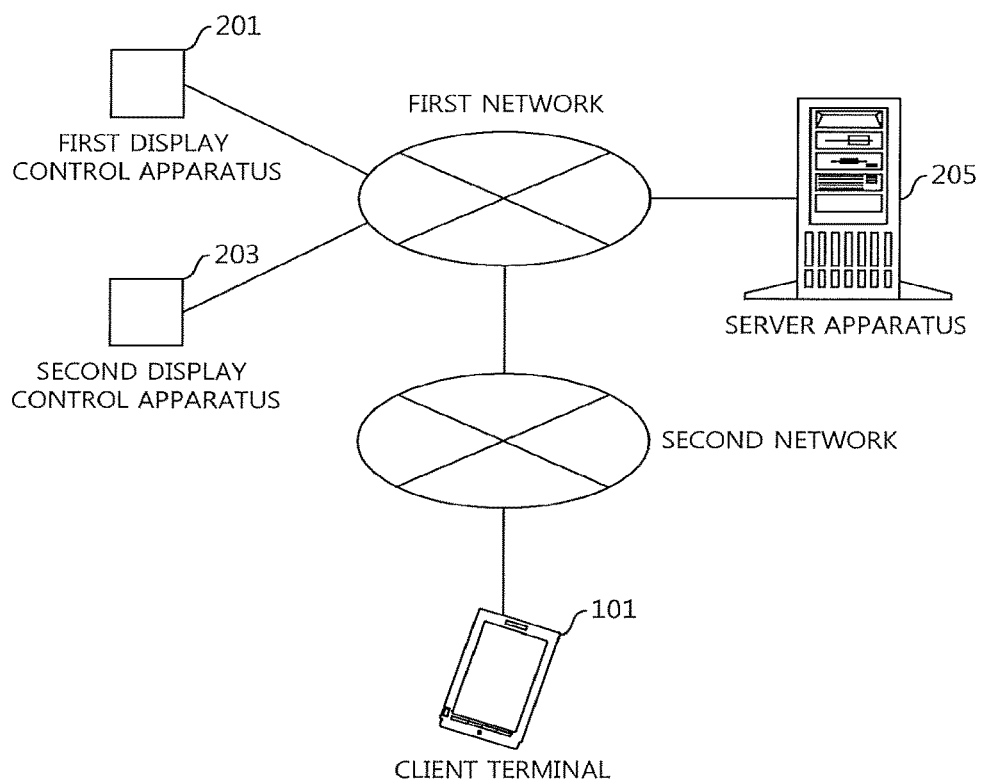
FIG. 2 is a diagram depicting an example of a network configuration.

FIG. 2 illustrates an example of a network configuration. The first display control apparatus 201 has a display device that provides the left display surface 105 which is illustrated in FIG. 1. The second display control apparatus 203 has a display device that provides the right display surface 107 which is illustrated in FIG. 1. The server apparatus 205 mediates between the client terminal 101 and each display control apparatus (in this example, the first display control apparatus 201 and the second display control apparatus 203), and mainly manages data that relates to a window frame in each display control apparatus.

The display device is, for example, a liquid crystal display, a plasma display or a projector. In the case of a liquid crystal display and a plasma display, a display screen of the device is the display surface. In the case of a projector, a screen on which an image is projected is the display surface.

The first display control apparatus 201 and the second display control apparatus 203 are connected to a server apparatus 205 via a first network. The first network is, for example, a LAN (Local Area Network). The first display control apparatus 201 and the second display control apparatus 203 are connected to the first network by a wire or wirelessly. The server apparatus 205 is also connected to the first network by a wire or wirelessly.

The client terminal 101 has a function to connect to the first network via a second network. In this example, the second network is the Internet, and the client terminal 101 has a function to connect to the Internet via a mobile communication network.

Figure 3:
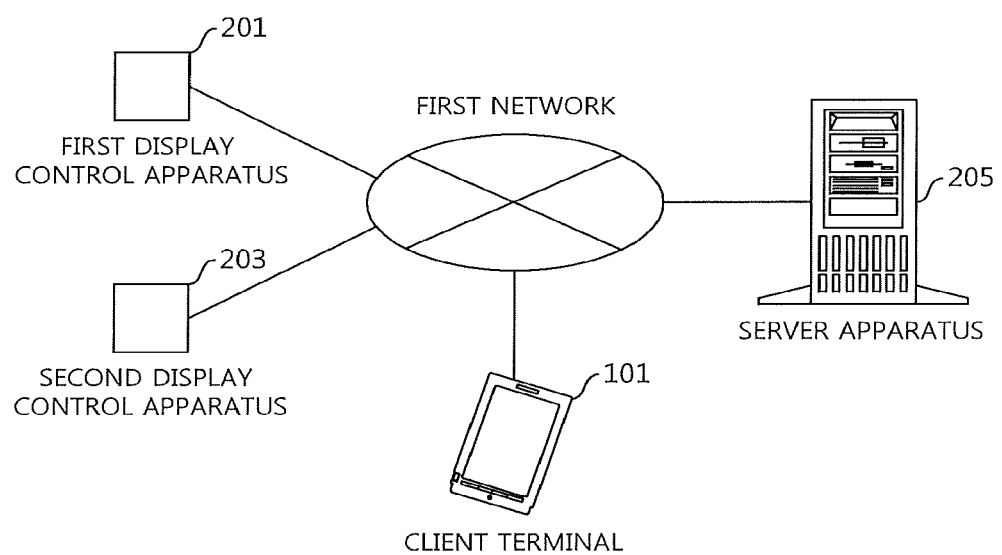
FIG. 3 is a diagram depicting an example of the network configuration.

FIG. 3 illustrates another example of a network configuration. The client terminal 101 may be directly connected to the first network. The client terminal 101 may be connected to the first network by a wire or may be connected to the first network wirelessly.

In the following, a sequence in the multi-display system will be explained. First, a sequence in the case where a window is generated on an entire screen in which the left display surface 105 and the right display surface 107 are arranged will be explained.

Figure 4:
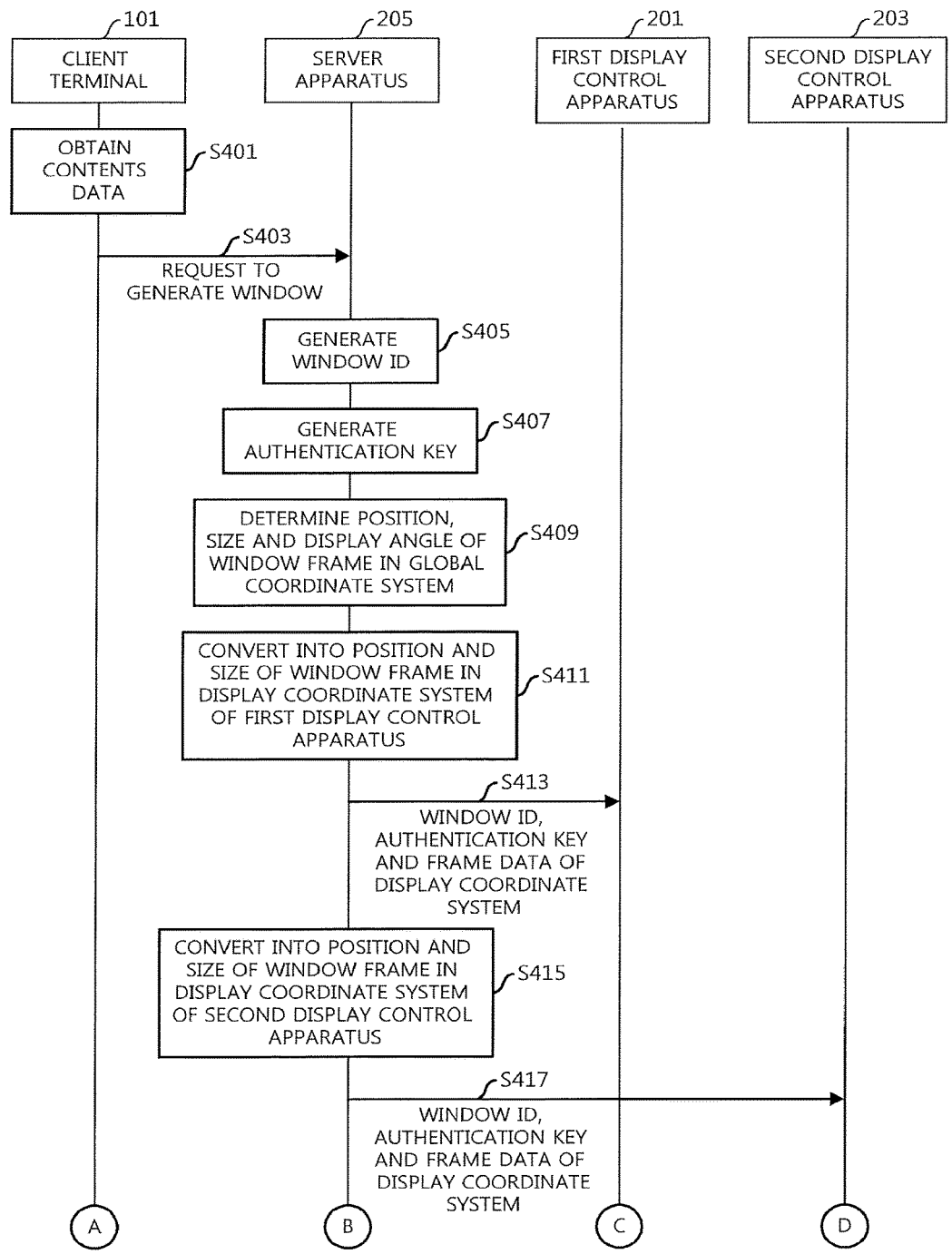
FIG. 4 is a diagram depicting an example of a sequence of window generation.

FIG. 4 illustrates an example of a sequence of window generation. For example, the client terminal 101 obtains the contents data 103 via a browser operating on the client terminal 101 (S401). In a case where the contents data 103 is already held, processing for obtaining the contents data 103 may be omitted. In this example, the contents data 103 includes an HTML (HyperText Markup Language) file and a CSS (Cascading Style Sheets) file.

When obtaining the contents data 103, the client terminal 101 transmits a request to generate a window to the server apparatus 205 (S403). The server apparatus 205 generates a window ID (S405), and further generates an authentication key (S407). The window ID identifies a window to be generated. The authentication key is used to authenticate the client terminal 101. However, in a case where the client terminal 101 is not authenticated, the authentication key may not be generated.

The server apparatus 205 determines, for a window frame to be generated, a position, size and a display angle in a global coordinate system (S409). A method for determining the position, size and display angle in the global coordinate system is arbitrary. For example, it may be determined as a predetermined position, predetermined size and a predetermined display angle. Alternatively, a position, size and a display angle of a new window frame may be determined so as not to overlap with the existing window frame.

The server apparatus 205 converts the position and size of the window frame in the global coordinate system into a position and size of the window frame in a display coordinate system of the left display surface 105 (S411). However, the display angle of the window frame is not changed. In the following, the display coordinate system of the left display surface 105 is referred to as the display coordinate system of the first display control apparatus 201. In addition, the position, size and display angle may be referred to as frame data.

The server apparatus 205 transmits the window ID generated in S405, the authentication key generated in S407, and the frame data of the display coordinate system converted in S411 to the first display control apparatus 201 (S413).

For the second display control apparatus 203 as well, the server apparatus 205 converts the position and size of the window frame in the global coordinate system into a position and size of the window frame in a display coordinate system of the right display surface 107 (S415). Hereinafter, the display coordinate system of the right display surface 107 is referred to as the display coordinate system of the second display control apparatus 203.

In addition, the server apparatus 205 transmits the window ID generated in S405, the authentication key generated in S407, and the frame data of the display coordinate system converted in S415 to the second display control apparatus 203 (S417).

Figure 5:
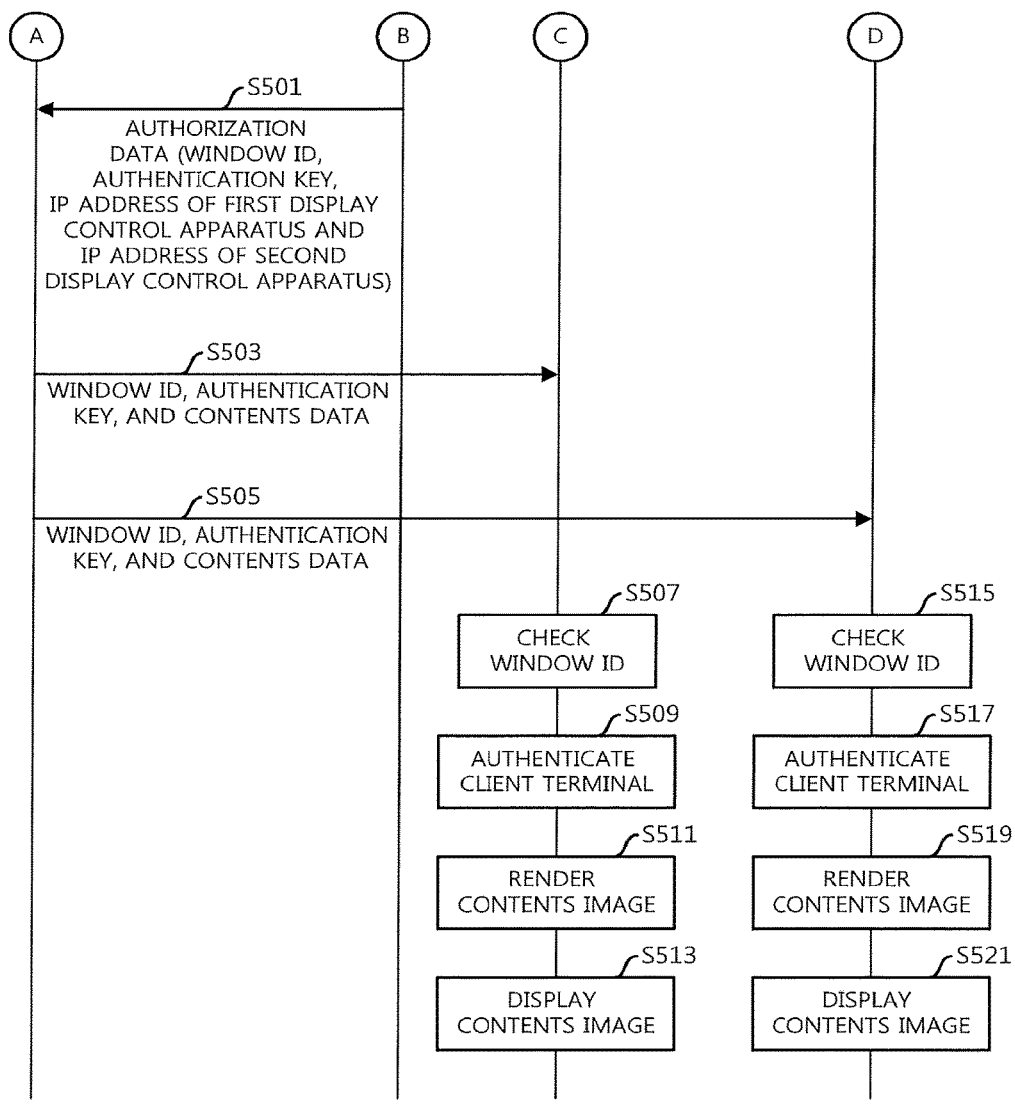
FIG. 5 is a diagram depicting an example of a sequence of the window generation.

The subsequent sequence shifts to FIG. 5 via terminals A to D. The server apparatus 205 transmits authorization data to the client terminal 101 (S501). In this example, the server apparatus 205 does not transmit the same authorization data to client terminals 101 other than the client terminal 101 that requested the window generation in S403. The authorization data includes a window ID, an authentication key, an IP address of the first display control apparatus 201, and an IP address of the second display control apparatus 203. The IP address of the first display control apparatus 201 is used to transmit data from the client terminal 101 to the first display control apparatus 201. The IP address of the second display control apparatus 203 is used to transmit data from the client terminal 101 to the second display control apparatus 203.

When the client terminal 101 receives the authorization data, the client terminal 101 transmits the window ID included in the authorization data, the authentication key included in the authorization data, and the contents data 103 obtained in S401 of FIG. 4 to the first display control apparatus 201 (S503). Furthermore, the client terminal 101 similarly transmits the window ID, authentication key and contents data 103 to the second display control apparatus 203 (S505).

First, a sequence in the first display control apparatus 201 will be explained. When receiving the window ID, the authentication key and the contents data 103 in S503, the first display control apparatus 201 checks the window ID (S507). In other words, the first display control apparatus 201 determines whether the window ID received in S503 matches the window ID received in S413 in FIG. 4. If they match, since the check result is normal, the processing shifts to the next processing. If they do not match, the processing is interrupted because the check result is an error.

If the check result of the window ID is normal, the first display control apparatus 201 authenticates the client terminal 101 (S509). In other words, the first display control apparatus 201 determines whether or not the authentication key received in S503 matches the authentication key received in S413 in FIG. 4. If they match, since the authentication result is normal, the processing shifts to the next processing. If they do not match, the processing is interrupted because the authentication result is an error. The authentication of the client terminal 101 may be omitted.

When the authentication of the client terminal 101 has succeeded, the first display control apparatus 201 renders a contents image 109 based on the frame data received in S413 of FIG. 4 and the contents data 103 received in S503 (S511). Then, the first display control apparatus 201 causes the display device to display the rendered contents image 109 on the left display surface 105 (S513).

Next, a sequence in the second display control apparatus 203 will be explained. When receiving the window ID, authentication key and contents data 103 in S505, the second display control apparatus 203 checks the window ID (S515). In other words, the second display control apparatus 203 determines whether or not the window ID received in S505 matches the window ID received in S417 in FIG. 4. If they match, since the check result is normal, the processing shifts to the next processing. If they do not match, the processing is interrupted because the check result is an error.

If the check result of the window ID is normal, the second display control apparatus 203 authenticates the client terminal 101 (S517). That is, the second display control apparatus 203 determines whether or not the authentication key received in S505 matches the authentication key received in S417 in FIG. 4. If they match, since the authentication result is normal, the processing shifts to the next processing. If they do not match, the processing is interrupted because the authentication result is an error. Incidentally, the authentication of the client terminal 101 may be omitted.

When the authentication of the client terminal 101 has succeeded, the second display control apparatus 203 renders the contents image 109 based on the frame data received in S417 of FIG. 4 and the contents data 103 received in S505 (S519). Then, the second display control apparatus 203 causes the display device to display the rendered contents image 109 on the right display surface 107 (S521).

Figure 6:
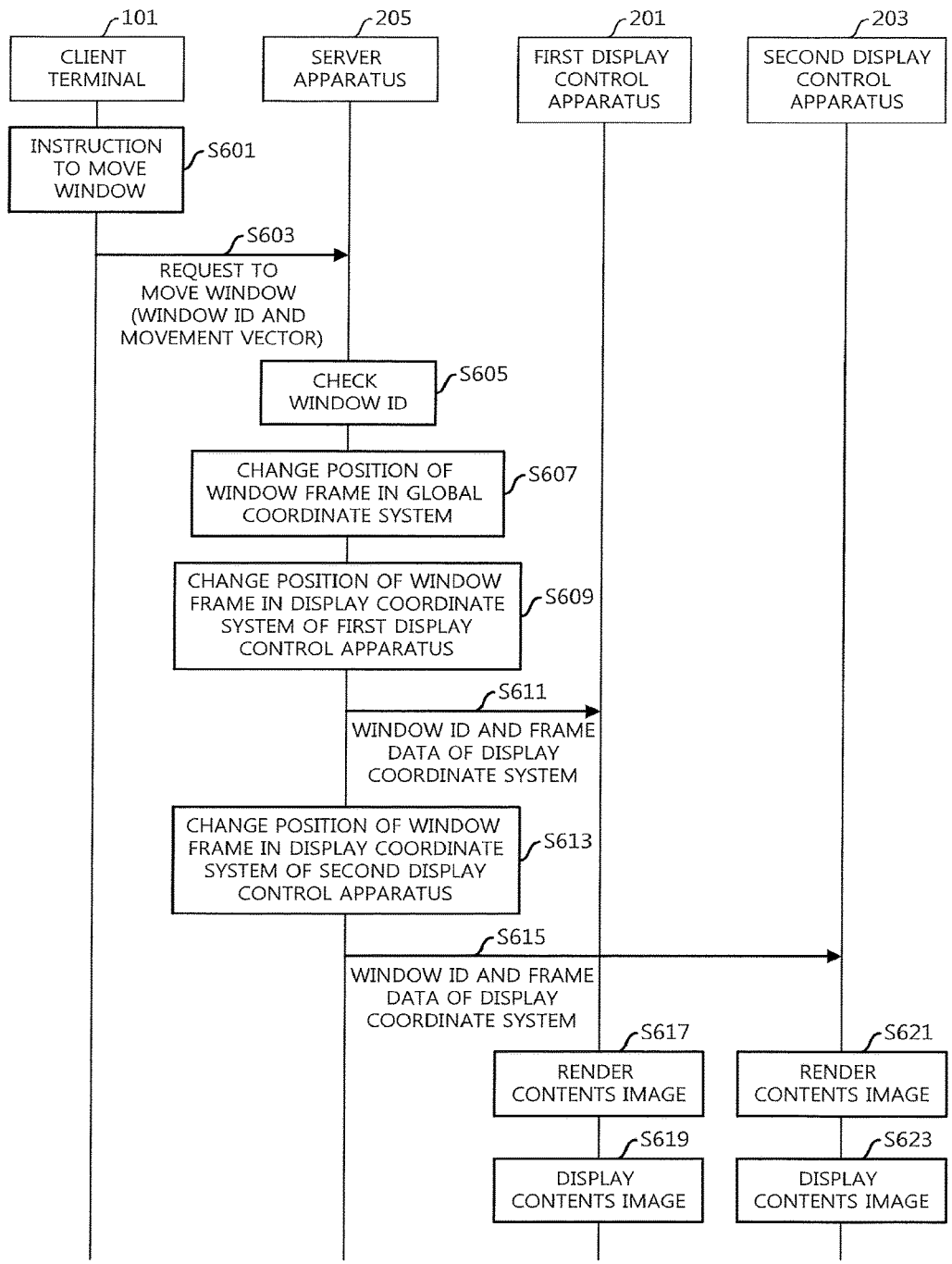
FIG. 6 is a diagram depicting an example of a sequence of window movement.

Next, a sequence in a case of moving a window will be explained. FIG. 6 illustrates an example of a sequence of window movement. When the client terminal 101 receives an instruction to move a window through a user interface (S601), the client terminal 101 transmits a request to move a window to the server apparatus 205 (S603). The request to move a window includes a window ID and a movement vector.

When the server apparatus 205 receives a request to move a window, the server apparatus 205 checks the window ID included in the request to move the window (S605). In other words, when the window ID included in the request to move the window matches the window ID generated in S405 of FIG. 4, the server apparatus 205 shifts to the next processing because the check result is normal. On the other hand, when the window ID included in the request to move the window does not match the window ID generated in S405 of FIG. 4, the processing is interrupted since the check result is an error.

The server apparatus 205 changes the position of the window frame in the global coordinate system according to the movement vector included in the request to move the window, which was received in S603 (S607). However, the size and display angle of the window frame are not changed.

The server apparatus 205 also changes the position of the window frame in the display coordinate system of the first display control apparatus 201 according to the movement vector as well (S609). As described above, the size and display angle of the window frame are not changed. The server apparatus 205 transmits the window ID and frame data of the display coordinate system, which was changed in S609, to the first display control apparatus 201 (S611).

The server apparatus 205 also changes the position of the window frame in the display coordinate system of the second display control apparatus 203 in accordance with the movement vector as well (S613). As described above, the size and display angle of the window frame are not changed. The server apparatus 205 transmits the window ID and frame data of the display coordinate system, which was changed in S613, to the second display control apparatus 203 (S615).

The first display control apparatus 201 changes, in accordance with the frame data received in S611, the position of the window frame identified by the window ID, and renders the contents image 109 based on the contents data 103 (S617). Then, the first display control apparatus 201 causes the display device to display the contents image 109 rendered in the window frame (S619).

Similarly, the second display control apparatus 203 changes the position of the window frame identified by the window ID in accordance with the frame data received in S615, and renders the contents image 109 based on the contents data 103 (S621). Then, the second display control apparatus 203 causes the display device to display the contents image 109 rendered in the window frame (S623).

Figure 7:
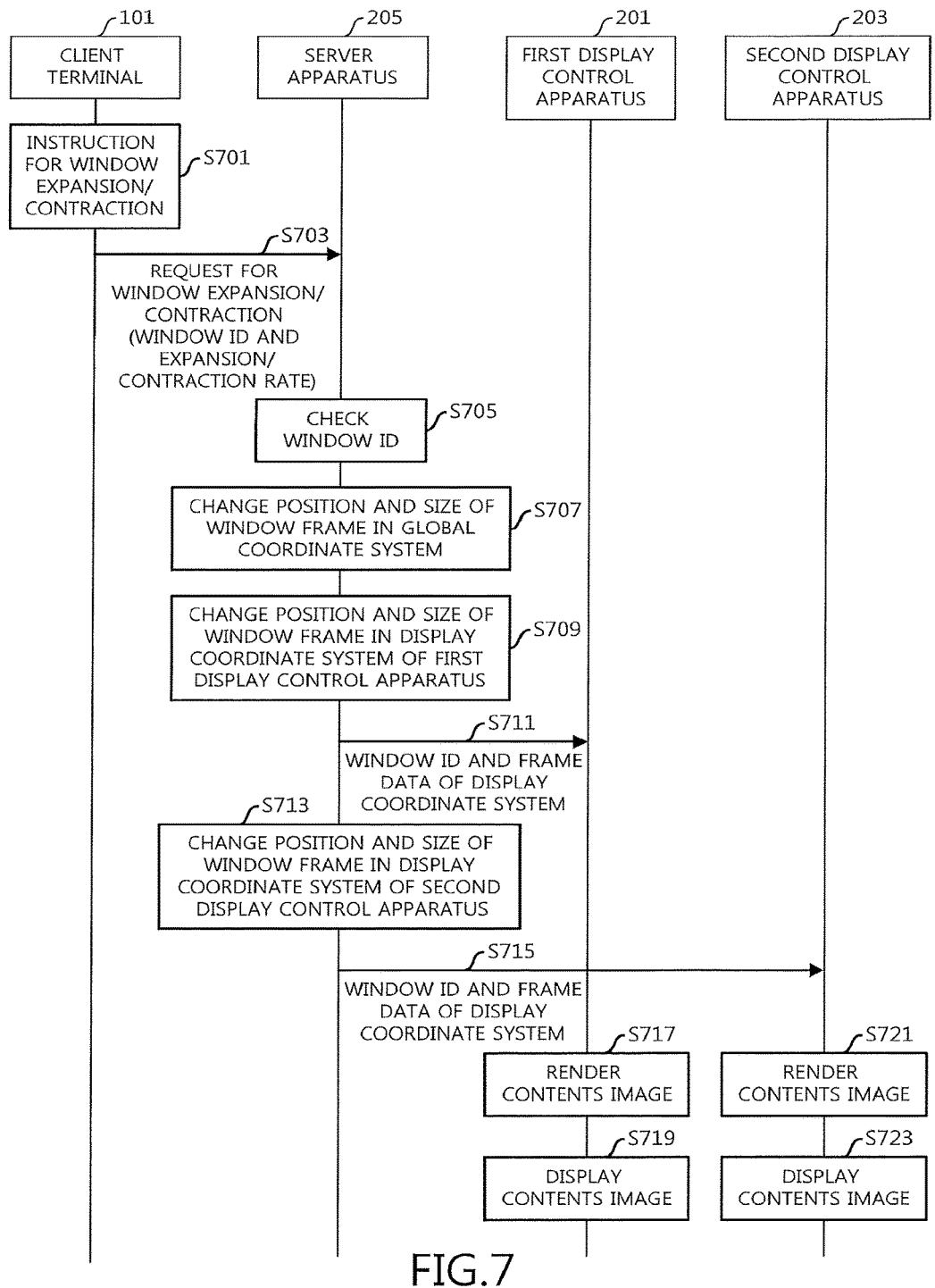
FIG. 7 is a diagram depicting an example of a sequence of window expansion/contraction.

Next, a sequence in a case of expanding or contracting a window will be explained. In the following, expansion or contraction of the window is referred to as window expansion/contraction. FIG. 7 illustrates an example of a sequence of the window expansion/contraction. When the client terminal 101 accepts an instruction for the window expansion/contraction through the user interface (S701), the client terminal 101 transmits a request for the window expansion/contraction to the server apparatus 205 (S703). The request for the window expansion/contraction includes the window ID and the expansion/contraction rate.

When the server apparatus 205 receives the request for the window expansion/contraction, as described above, the server apparatus 205 checks the window ID included in the request for the window expansion/contraction (S705).

The server apparatus 205 changes the position and size of the window frame in the global coordinate system according into an expansion/contraction rate included in the window expansion/contraction request received in S703 (S707). However, the display angle of the window frame is not changed.

The server apparatus 205 also changes the position and size of the window frame in the display coordinate system of the first display control apparatus 201 according to the extraction/contraction rate as well (S709). As described above, the display angle of the window frame is not changed. The server apparatus 205 transmits the window ID and the frame data of the display coordinate system, which was changed in S709, to the first display control apparatus 201 (S711).

The server apparatus 205 also changes the position and size of the window frame in the display coordinate system of the second display control apparatus 203 according to the expansion/contraction rate as well (S713). As described above, the display angle of the window frame is not changed. The server apparatus 205 transmits the window ID and frame data of the display coordinate system, which was changed in S713, to the second display control apparatus 203 (S715).

The first display control apparatus 201 changes the position and size of the window frame identified by the window ID in accordance with the frame data received in S711, and renders the contents image 109 based on the contents data 103 (S717). Then, the first display control apparatus 201 causes the display device to display the contents image 109 rendered in the window frame (S719).

Similarly, the second display control apparatus 203 changes the position and size of the window frame identified by the window ID in accordance with the frame data received in S715, and renders the contents image 109 based on the contents data 103 (S721). Then, the second display control apparatus 203 causes the display device to display the contents image 109 rendered in the window frame (S723).

Figure 8:
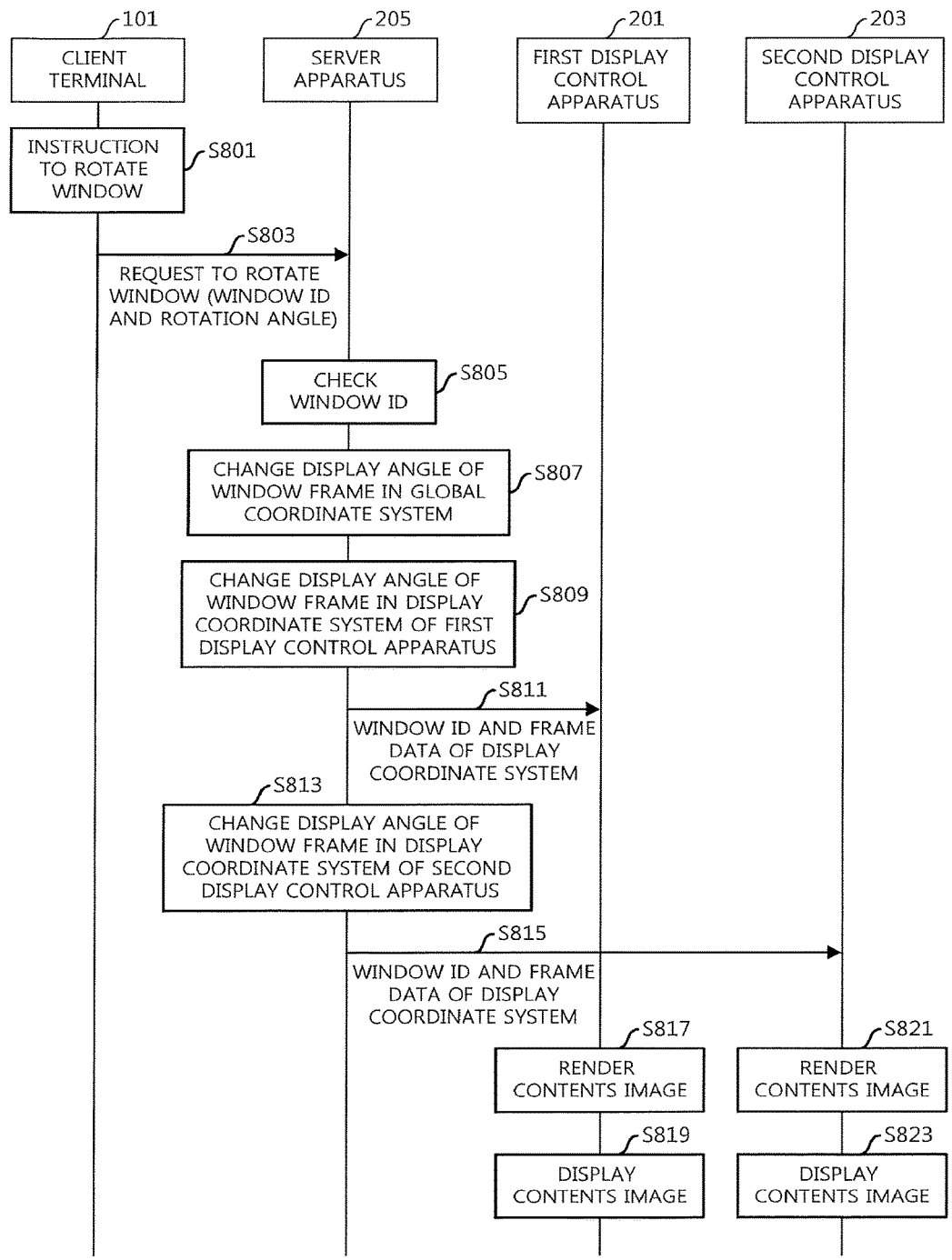
FIG. 8 is a diagram depicting an example of a sequence of window rotation.

Next, a sequence in a case of rotating a window will be explained. FIG. 8 illustrates an example of a sequence of window rotation. When the client terminal 101 receives an instruction to rotate a window through the user interface (S801), the client terminal 101 transmits a request to rotate a window to the server apparatus 205 (S803). The request to rotate the window includes a window ID and a rotation angle.

When the server apparatus 205 receives the request to rotate the window, as described above, the server apparatus 205 checks the window ID included in the request to rotate the window (S805).

The server apparatus 205 changes the display angle of the window frame in the global coordinate system according to the rotation angle included in the request to rotate the window, which was received in S803 (S807). However, the position and size of the window frame are not changed.

The server apparatus 205 also changes the display angle of the window frame in the display coordinate system of the first display control apparatus 201 according to the rotation angle as well (S809). As described above, the position and size of the window frame are not changed. The server apparatus 205 transmits the window ID to the first display control apparatus 201 and the frame data of the display coordinate system, which was changed in S809 (S811).

The server apparatus 205 also changes the display angle of the window frame in the display coordinate system of the second display control apparatus 203 according to the rotation angle as well (S813). As described above, the position and size of the window frame are not changed. The server apparatus 205 transmits the window ID to the second display control apparatus 203 and the frame data of the display coordinate system, which was changed in S813 (S815).

The first display control apparatus 201 changes the display angle of the window frame identified by the window ID in accordance with the frame data received in S811, and renders the contents image 109 based on the contents data 103 (S817). Then, the first display control apparatus 201 causes the display device to display the contents image 109 rendered in the window frame (S819).

Similarly, the second display control apparatus 203 changes the display angle of the window frame identified by the window ID in accordance with the frame data received in S815, and renders the contents image 109 based on the contents data 103 (S821). Then, the second display control apparatus 203 causes the display device to display the contents image 109 rendered in the window frame (S823).

Figure 9:
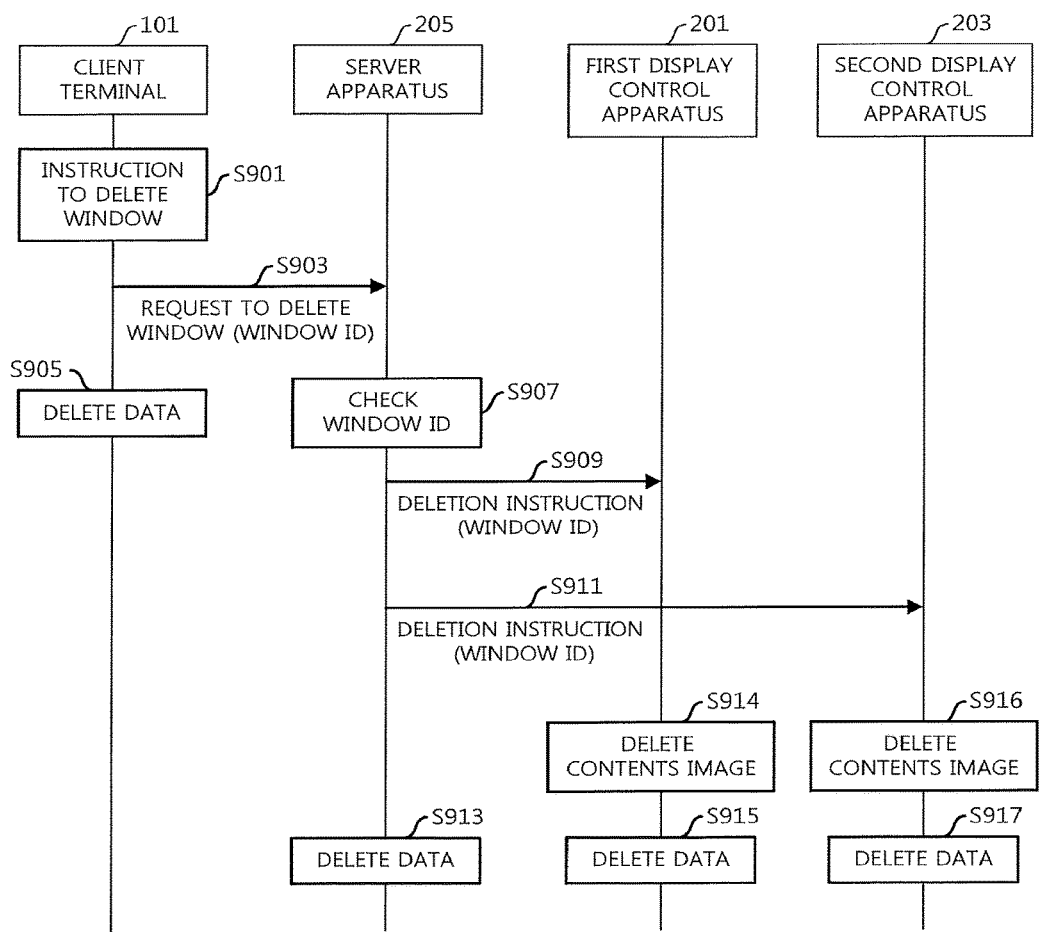
FIG. 9 is a diagram depicting an example of a sequence of window deletion.

Next, a sequence in a case of deleting a window will be explained. FIG. 9 illustrates an example of a sequence of window deletion. When the client terminal 101 accepts an instruction to delete a window through the user interface (S901), the client terminal 101 transmits a request to delete a window to the server apparatus 205 (S903). The request to delete the window includes the window ID. The client terminal 101 deletes data relating to the window to be deleted (S905). The data to be deleted will be described later.

When the server apparatus 205 receives the request to delete the window, as described above, the server apparatus 205 checks the window ID included in the request to delete the window (S907). The server apparatus 205 transmits a deletion instruction including the window ID to the first display control apparatus 201 (S909). Furthermore, the server apparatus 205 transmits the deletion instruction including the window ID to the second display control apparatus 203 (S911). Then, the server apparatus 205 deletes data relating to the window to be deleted (S913). The data to be deleted will be described later.

When the first display control apparatus 201 receives the deletion instruction including the window ID, the first display control apparatus 201 deletes the contents image 109 rendered in the window frame identified by the window ID (S914). Specifically, the first display control apparatus 201 removes the contents image 109 corresponding to the upper layer. Then, the first display control apparatus 201 deletes the data relating to the window identified by the window ID (S915).

Similarly, when the second display control apparatus 203 receives the deletion instruction including the window ID, the second display control apparatus 203 deletes the contents image 109 rendered in the window frame identified by the window ID (S916). Similarly, the second display control apparatus 203 deletes the data relating to the window identified by the window ID (S917). The explanation for the sequence ends.

Figure 10:
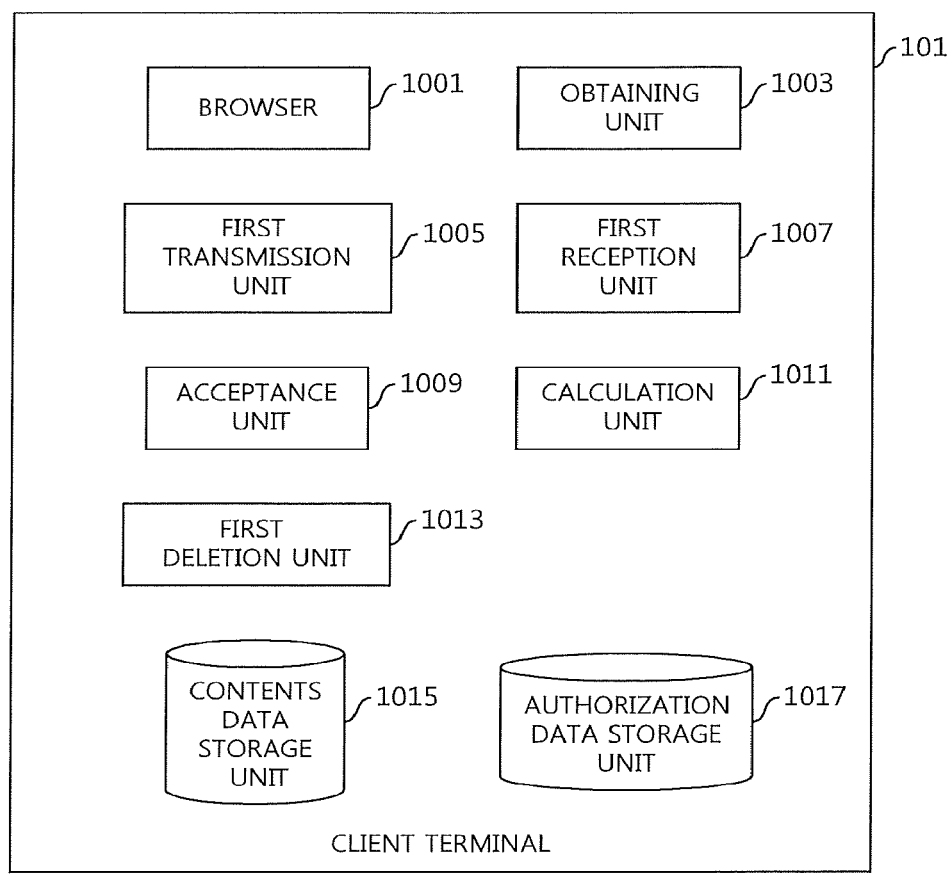
FIG. 10 is a diagram depicting an example of a module configuration of a client terminal.

Next, an operation of the client terminal 101 will be explained. FIG. 10 illustrates an example of a module configuration of the client terminal 101. The client terminal 101 has a browser 1001, an obtaining unit 1003, a first transmission unit 1005, a first reception unit 1007, an acceptance unit 1009, a calculation unit 1011, a first deletion unit 1013, a contents data storage unit 1015, and an authorization data storage unit 1017.

The browser 1001 receives contents data 103 (in this example, HTML file and CSS file), and displays a contents image based on the contents data 103. The obtaining unit 1003 obtains the contents data 103 from the browser 1001. The first transmission unit 1005 transmits plural types of data to the first display control apparatus 201, the second display control apparatus 203, and the server apparatus 205. The first reception unit 1007 receives authorization data from the server apparatus 205. The acceptance unit 1009 accepts an instruction from the user by using the user interface of the client terminal 101. The calculation unit 1011 calculates a movement vector in the window movement, an expansion/contraction rate in the window expansion/contraction, and a rotation angle in the window rotation. The first deletion unit 1013 deletes unnecessary data. The contents data storage unit 1015 stores the contents data 103. The authorization data storage unit 1017 stores the authorization data.

The browser 1001, the obtaining unit 1003, the first transmission unit 1005, the first reception unit 1007, the acceptance unit 1009, the calculation unit 1011, and the first deletion unit 1013 described above are realized by using hardware resources (for example, FIG. 31) and a program that causes a processor to execute processing described below.

Figure 31:
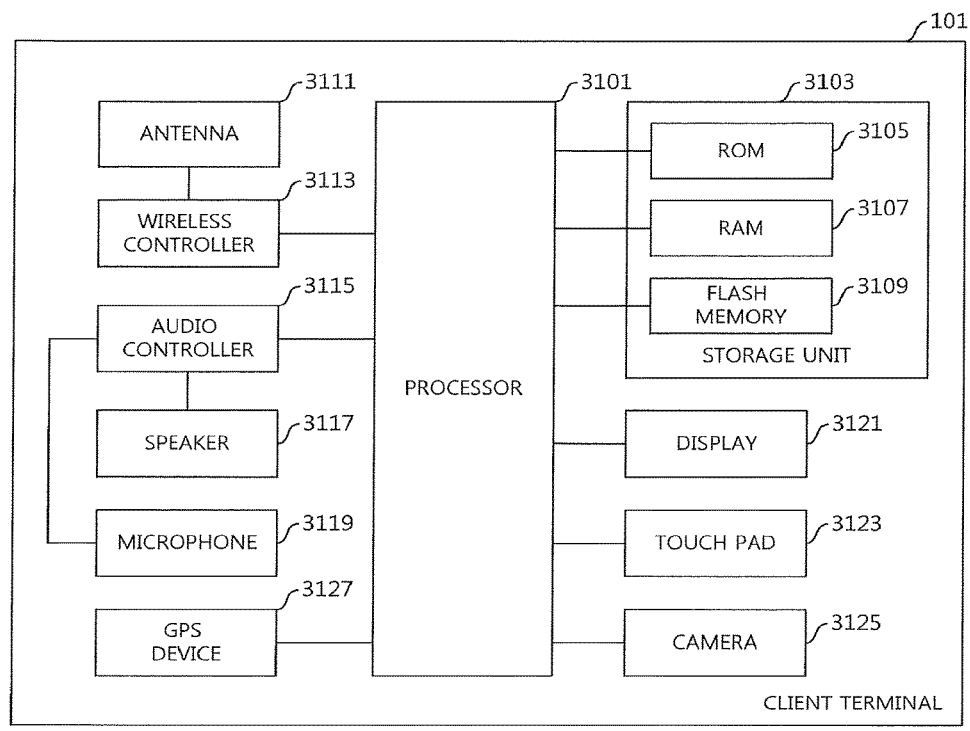
FIG. 31 is a diagram depicting an example of a hardware configuration of the client terminal.

The above-mentioned contents data storage unit 1015 and authorization data storage unit 1017 are realized by using hardware resources (for example, FIG. 31).

Figure 11:
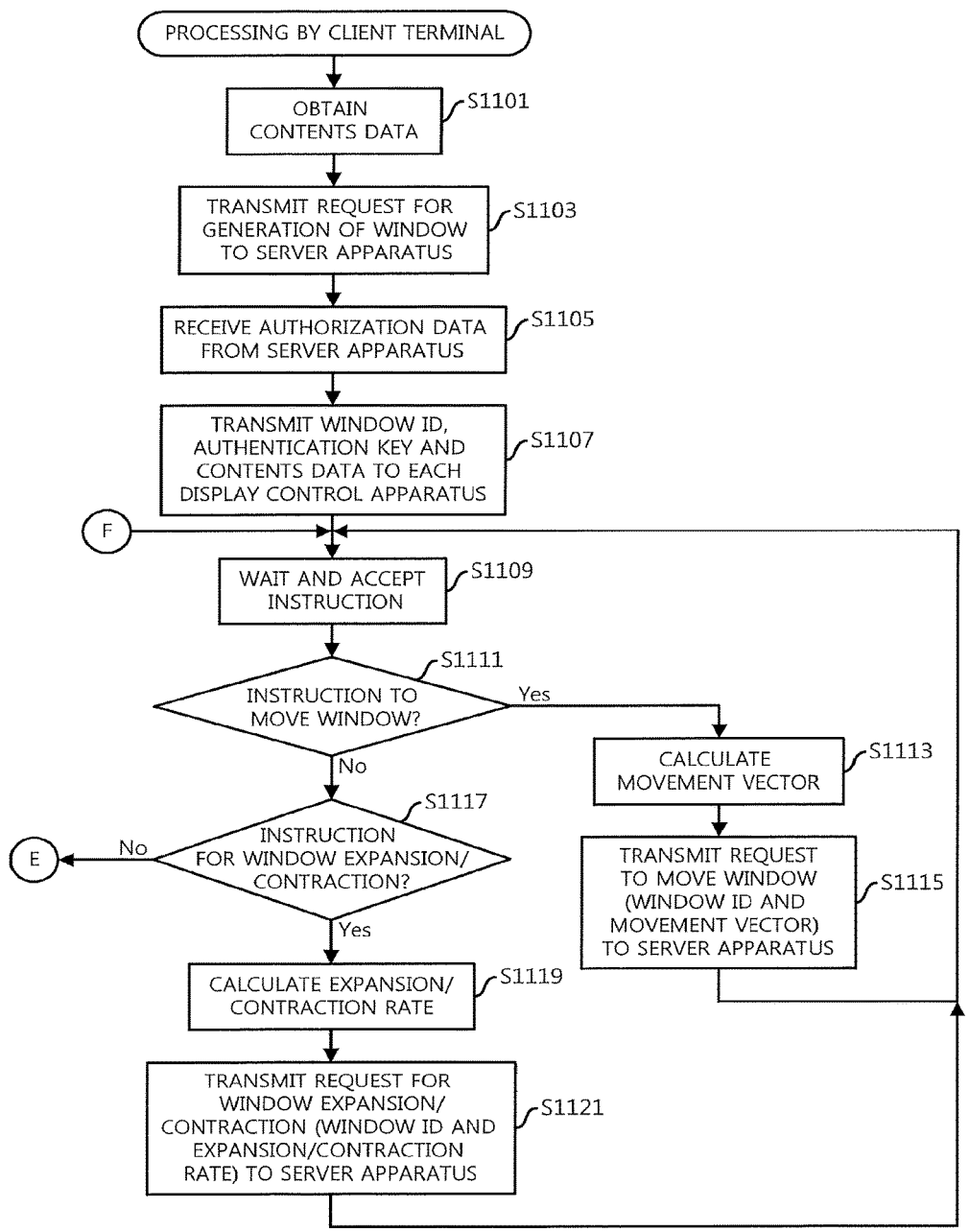
FIG. 11 is a diagram depicting an example of a processing flow for the client terminal.
Figure 12:
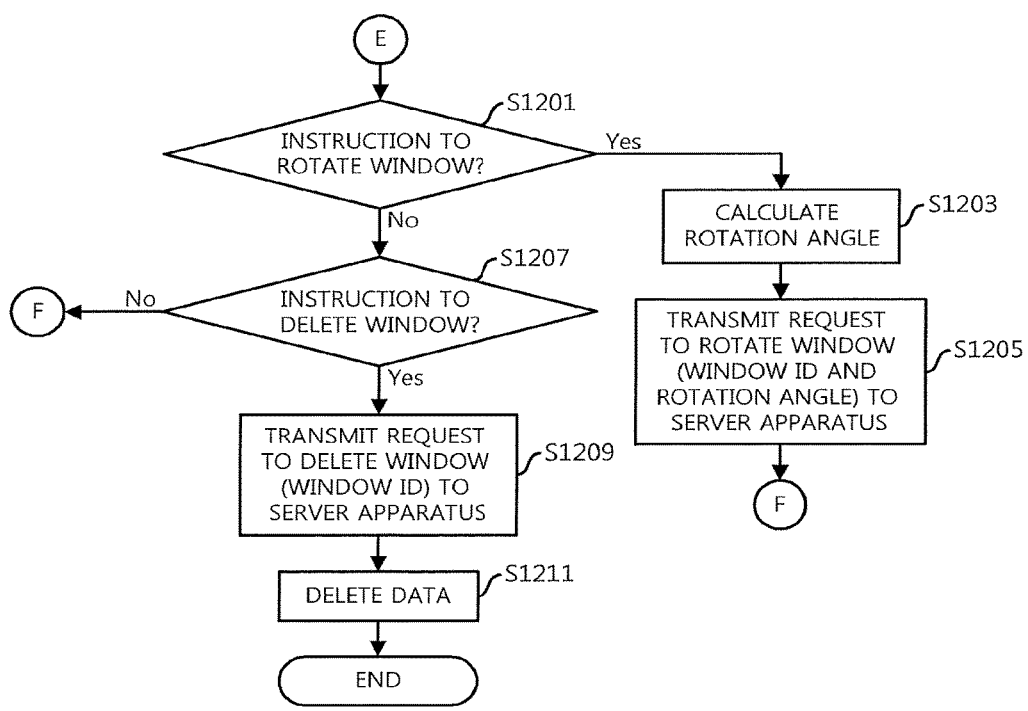
FIG. 12 is a diagram depicting an example of a processing flow for the client terminal.

Processing by the client terminal 101 will be explained. FIG. 11 and FIG. 12 illustrate examples of processing flows of the client terminal 101. The obtaining unit 1003 obtains the contents data 103 from the browser 1001 (S1101). Alternatively, the obtaining unit 1003 may obtain the contents data 103 stored in advance in the contents data storage unit 1015.

The first transmission unit 1005 transmits a request to generate a window to the server apparatus 205 (S1103). The first reception unit 1007 receives the authorization data from the server apparatus 205 (S1105). As described above, the authorization data includes the window ID, the authentication key, the IP address of the first display control apparatus 201, and the IP address of the second display control apparatus 203. The first reception unit 1007 stores the received authorization data in the authorization data storage unit 1017.

The first transmission unit 1005 transmits the window ID included in the authorization data, the authentication key included in the authorization data, and the contents data 103 obtained in S1101 to each display control apparatus (S1107). In this example, the first transmission unit 1005 transmits the aforementioned data to the IP address of the first display control apparatus 201, and further transmits to the IP address of the second display control apparatus 203.

After that, the acceptance unit 1009 waits and accepts an instruction from the user by using the user interface of the client terminal 101 (S1109). The acceptance unit 1009 determines whether or not the accepted instruction is an instruction to move a window (S1111).

When it is determined that the accepted instruction is an instruction to move a window, the calculation unit 1011 calculates a movement vector (S1113). For example, the calculation unit 1011 obtains the movement vector based on a direction and an amount of a slide at a touch position on a touch panel. Alternatively, the calculation unit 1011 calculates the movement vector based on a type of a touched movement button and the number of times of touches.

The first transmission unit 1005 transmits a request to move a window to the server apparatus 205 (S1115). The request to move the window includes the window ID included in the authorization data received in S1105 and the movement vector calculated in S1113. Then, returning to the processing illustrated in S1109, the aforementioned processing is repeated.

On the other hand, when it is determined in S1111 that the instruction accepted in S1109 is not an instruction to move a window, the acceptance unit 1009 determines whether or not the instruction received in S1109 is an instruction for the window expansion/contraction (S1117).

When it is determined that the instruction accepted in S1109 is an instruction for the window expansion/contraction, the calculation unit 1011 calculates the expansion/contraction rate (S1119). The calculation unit 1011 calculates the expansion/contraction rate, for example, based on an amount of a pinch in the touch panel. Alternatively, the calculation unit 1011 calculates the expansion/contraction rate based on the number of times of touches of a touched expansion button or contraction button.

The first transmission unit 1005 transmits a request for the window expansion/contraction request to the server apparatus 205 (S1121). The request for the window expansion/contraction includes the window ID included in the authorization data received in S1105 and the expansion/contraction rate calculated in S1119. Then, returning to the processing illustrated in S1109, the aforementioned processing is repeated.

On the other hand, when it is determined in S1117 that the instruction accepted in S1109 is not an instruction for the window expansion/contraction, the processing shifts to S1201 illustrated in FIG. 12 via terminal E.

Shifting to an explanation of FIG. 12, the acceptance unit 1009 determines whether or not the instruction accepted in S1109 of FIG. 11 is an instruction to rotate a window (S1201). When it is determined that the instruction accepted in S1109 of FIG. 11 is an instruction to rotate a window, the calculation unit 1011 calculates a rotation angle (S1203). For example, the calculation unit 1011 calculates the rotation angle based on the number of times of touches of a touched right rotation button or left rotation button.

The first transmission unit 1005 transmits a request to rotate a window to the server apparatus 205 (S1205). The request to rotate the window includes the window ID included in the authorization data received in S1105 of FIG. 11 and the rotation angle calculated in S1203. Then, the processing returns to the processing illustrated in S1109 of FIG. 11 via the terminal F, and the aforementioned processing is repeated.

On the other hand, when it is determined in S1201 that the instruction accepted in S1109 of FIG. 11 is not an instruction to rotate a window, the acceptance unit 1009 determines whether or not the instruction accepted in S1109 of FIG. 11 is an instruction to delete a window (S1207).

If it is determined that the instruction accepted in S1109 of FIG. 11 is an instruction to delete a window, the first transmission unit 1005 transmits a request to delete a window to the server apparatus 205 (S1209). The window deletion request includes the window ID included in the authorization data received in S1105 of FIG. 11.

Then, the first deletion unit 1013 deletes the authorization data stored in the authorization data storage unit 1017 (S1211). At this time, the first deletion unit 1013 may delete the contents data 103 stored in the contents data storage unit 1015. Then, the processing of the client terminal 101 ends.

On the other hand, when it is determined in S1207 that the instruction accepted in S1109 of FIG. 11 is not an instruction to delete a window, it is regarded as an invalid instruction, and the processing returns to S1109 of FIG. 11 via terminal F, and the aforementioned processing is repeated. The explanation for the operation of the client terminal 101 ends.

Figures 13, 14:
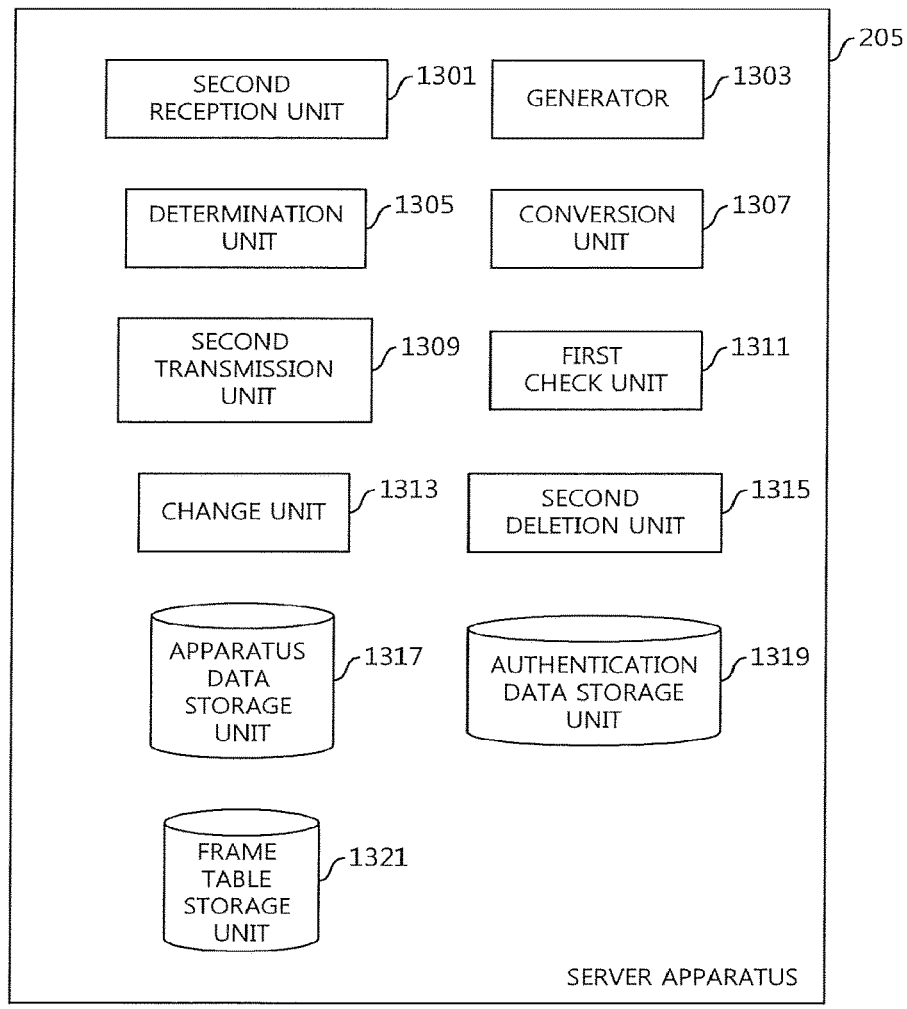
FIG. 13 is a diagram depicting an example of a module configuration for a server apparatus.
FIG. 14 is a diagram depicting an example of apparatus data.

Next, an operation of the server apparatus 205 will be explained. FIG. 13 illustrates an example of a module configuration of the server apparatus 205. The server apparatus 205 includes a second reception unit 1301, a generator 1303, a determination unit 1305, a conversion unit 1307, a second transmission unit 1309, a first check unit 1311, a change unit 1313, a second deletion unit 1315, an apparatus data storage unit 1317, an authentication data storage unit 1319 and a frame table storage unit 1321.

The second reception unit 1301 receives plural types of requests from the client terminal 101. The generator 1303 generates a window ID and an authentication key. The determination unit 1305 determines the position, size and display angle of a window frame in the global coordinate system. The conversion unit 1307 converts the position and size of the window frame in the global coordinate system into a position and size of the window frame in the display coordinate system of each display control apparatus. The second transmission unit 1309 transmits plural types of data to the client terminal 101, the first display control apparatus 201, and the second display control apparatus 203. The first check unit 1311 checks the window ID included in the plural types of requests. The change unit 1313 changes the frame data of the global coordinate system and the frame data of the display coordinate system according to plural types of requests. The second deletion unit 1315 deletes unnecessary data.

The apparatus data storage unit 1317 stores data relating to the first display control apparatus 201 and the second display control apparatus 203. The authentication data storage unit 1319 stores data for authenticating the client terminal 101. The frame table storage unit 1321 stores data relating to a window frame.

The second reception unit 1301, the generator 1303, the determination unit 1305, the conversion unit 1307, the second transmission unit 1309, the first check unit 1311, the change unit 1313, and the second deletion unit 1315 are realized by using hardware resources (for example, FIG. 32) and a program that causes the processor to execute processing described below.

Figure 32:
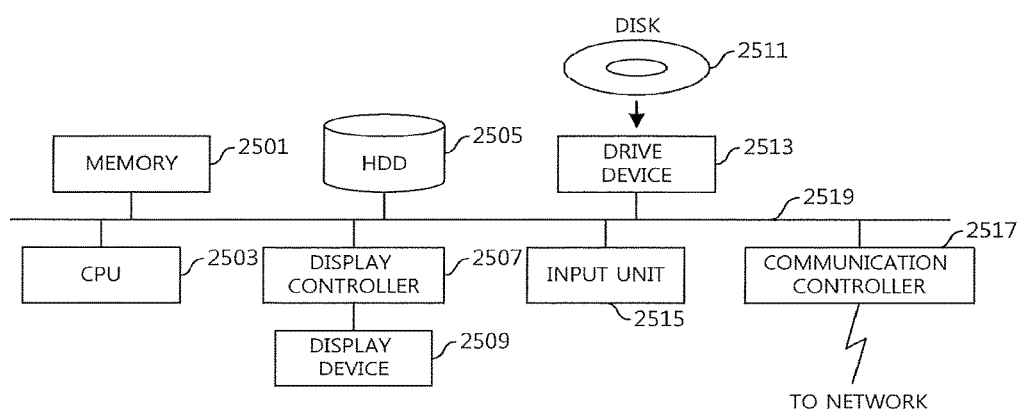
FIG. 32 is a functional block diagram of a computer.

The apparatus data storage unit 1317, the authentication data storage unit 1319, and the frame table storage unit 1321 described above are realized by using hardware resources (for example, FIG. 32).

Next, apparatus data stored in the apparatus data storage unit 1317 will be described. FIG. 14 illustrates an example of the apparatus data. The apparatus data in this example is in a table format. However, the apparatus data may be in a format other than the table format.

The apparatus data in this example has records corresponding to the display control apparatuses. The record of the apparatus data has a field for setting an ID of the display control apparatus, a field for setting an IP address of the display control apparatus, and a field for setting a position of the origin. The position of the origin represents a point in the global coordinate system, which corresponds to the origin of the display coordinate system of the display control apparatus. In other word, the position of the origin is data that identifies an arrangement of the display control apparatus in the entire screen.

The first record in this example corresponds to the first display control apparatus 201. The first record represents that the IP address of the display control apparatus identified by an ID of the display control apparatus "D1" is "xxx.xxx.xxx.1". Furthermore, the first record represents that the origin of the display coordinate system of the display control apparatus corresponds to a position (0, 0) in the global coordinate system.

The second record in this example corresponds to the second display control apparatus 203. The second record represents that an IP address of the display control apparatus identified by an ID of the display control apparatus "D2" is "xxx.xxx.xxx.2". Furthermore, the second record represents that the origin of the display coordinate system of the display control apparatus corresponds to a position (2000, 0) in the global coordinate system.

Figures 15, 16:
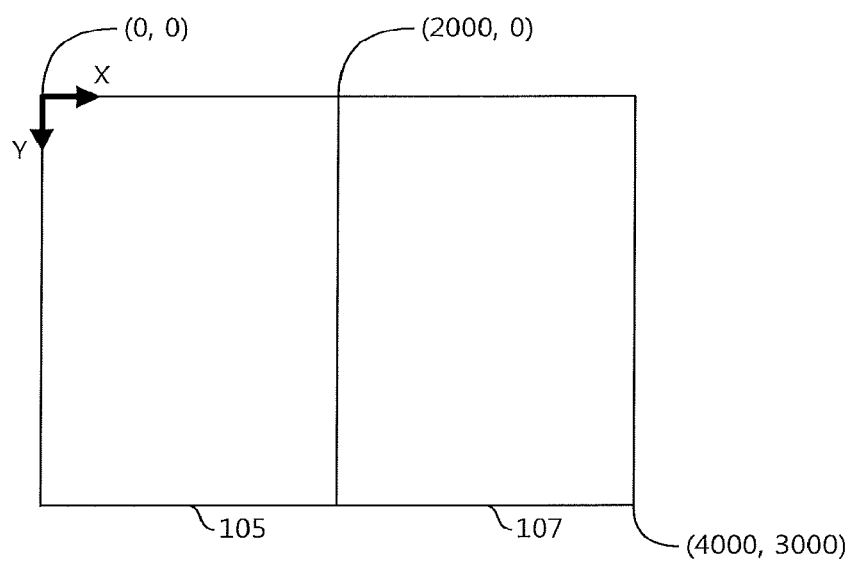
FIG. 15 is a diagram for explaining a global coordinate system.
FIG. 16 is a diagram depicting an example of authentication data.

Here, with reference to FIG. 15, the global coordinate system will be explained. The global coordinate system is a coordinate system for the entire screen. In this example, the origin of the global coordinate system is an upper-left end point of the entire screen. The Y-axis is set in the downward direction and the X-axis is set in the right direction. In this example, the width of the entire screen is 4000 (dots), and the height is 3000 (dots). Therefore, the coordinates of the lower-right end point of the entire screen are (4000, 3000).

As described above, in the entire screen in this example, the left display surface 105 and the right display surface 107 are aligned. The reference point on the left display surface 105, in other words, the origin in the display coordinate system of the left display surface 105, coincides with the origin (0, 0) in the global coordinate system. The reference point on the right display surface 107, in other words, the origin in the display coordinate system of the right display surface 107 corresponds to the position (2000, 0) in the global coordinate system.

Next, the authentication data stored in the authentication data storage unit 1319 will be explained. FIG. 16 illustrates an example of the authentication data. The authentication data in this example is in a table format. However, the authentication data may be in a format other than the table format.

The authentication data in this example has records corresponding to windows. The record of the authentication data has a field for setting a window ID that identifies the window and a field for setting the authentication key. The authentication key is used for authenticating the client terminal 101 that requested generation of the window.

The first record in this example represents that the authentication key "xxxx" is given to the client terminal 101 which requested generation of a window identified by the window ID "W 1". When plural windows are generated, plural records are provided.

Subsequently, a frame table stored in the frame table storage unit 1321 will be described. In the frame table, frame data in each coordinate system is set. The frame data may be held in a format other than the table format.

FIG. 17 illustrates an example of the frame table. The frame table storage unit 1321 stores the frame table in association with the window ID. In this example, the window ID is held in a header part of the frame table. The frame table in this example has a record corresponding to each coordinate system. The record of the frame data has a field for setting a position of a window frame, a field for setting the size of the window frame, and a field for setting a display angle of the window frame.

The position of the window frame is identified by an X coordinate and a Y coordinate that point to a reference point of the window frame. In this example, an upper-left end point of the window frame is the reference point. The size of the window frame is identified by the width and the height. A display angle of the window frame in a normal display form is 0 degree. Another point (for example, a center of gravity) in the window frame may be used as the reference point of the window frame.

In this example, the frame data of the global coordinate system is set in the first record of the frame table. Similarly, the frame data of the display coordinate system of the first display control apparatus 201 is set in the second record of the frame table. Similarly, the frame data of the display coordinate system of the second display control apparatus 203 is set in the third record of the frame table.

In the first record of the frame table in this example, a frame of the window identified by the window ID "W1" is set on a position (1000, 500) in the global coordinate system, with the size of the width "2000" and the height "2000" and a display angle "0". Moreover, a frame of the window identified by the window ID "W1" is set on a position (1000, 500) in the display coordinate system of the first display control apparatus 201, with the size of the width "2000" and the height "2000" and a display angle "0". Furthermore, a frame of the window identified by the window ID "W1" is set on a position (−1000, 500) in the display coordinate system of the second display control apparatus 203, the size of the width "2000" and the height "2000" and a display angle "0". When plural windows are generated, plural frame tables are provided.

Figure 18:
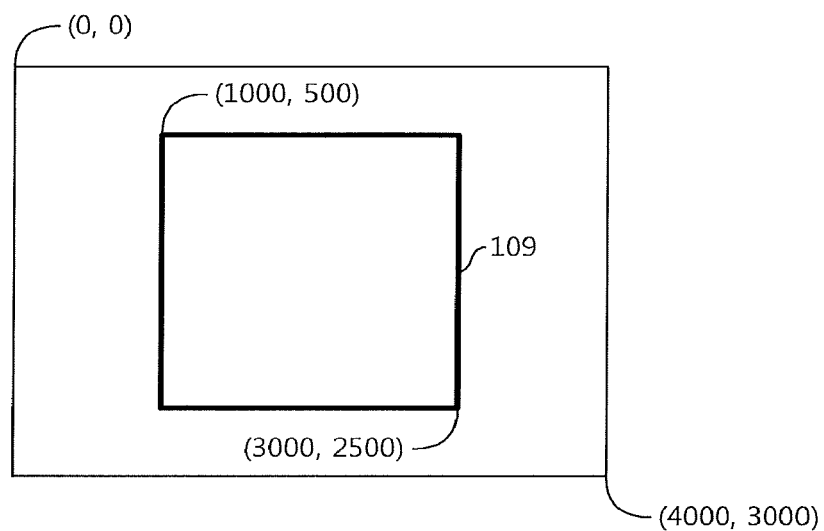
FIG. 18 is a diagram depicting a position of window frame in the global coordinate system.

With reference to FIG. 18, a position of a window frame in the global coordinate system will be explained. The width of the window frame that displays the contents image 109 in this example is 2000 (dots). Moreover, the height of the window frame is 2000 (dots). An upper-left end point corresponds to the position (1000, 500) in the global coordinate system. In other words, the reference point of the window frame is set on the position (1000, 500) in the global coordinate system. A lower-right end point corresponds to a position (3000, 2500) in the global coordinate system.

Figure 19:
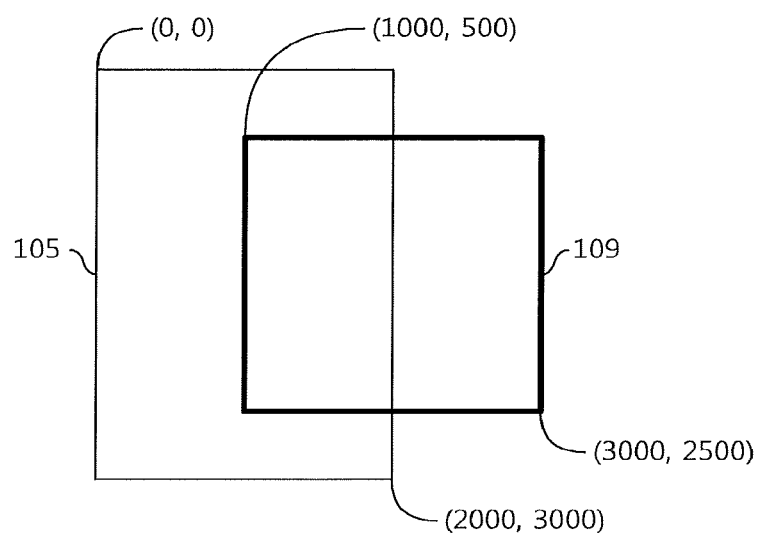
FIG. 19 is a diagram depicting a position of the window frame in a display coordinate system of a first display control apparatus.

With reference to FIG. 19, a position of a window frame in the display coordinate system of the first display control apparatus 201 will be explained. As described above, the display coordinate system of the first display control apparatus 201 means a display coordinate system of the left display surface 105 illustrated in FIG. 1. The width of the left display surface 105 is 2000 (dots), and the height of the left display surface 105 is 3000 (dots). A reference point of the window frame for displaying the contents image 109 in this example, an upper-left end point of the window frame) corresponds to the position (1000, 500) in the display coordinate system of the first display control apparatus 201. A lower-right end point of the window frame displaying the contents image 109 corresponds to a position (3000, 2500) in the display coordinate system of the first display control apparatus 201.

Figure 20:
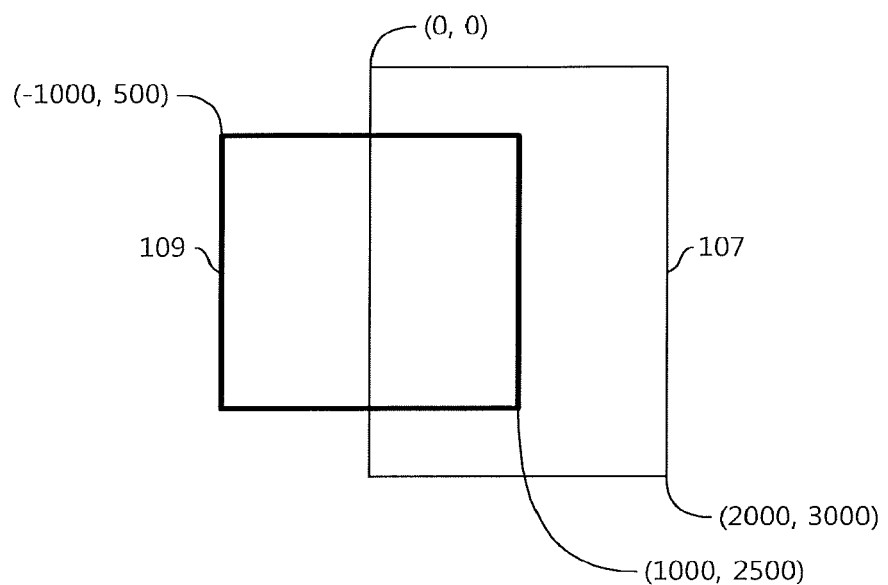
FIG. 20 is a diagram depicting a position of the window frame in a display coordinate system of a second display control apparatus.
Figure 21:
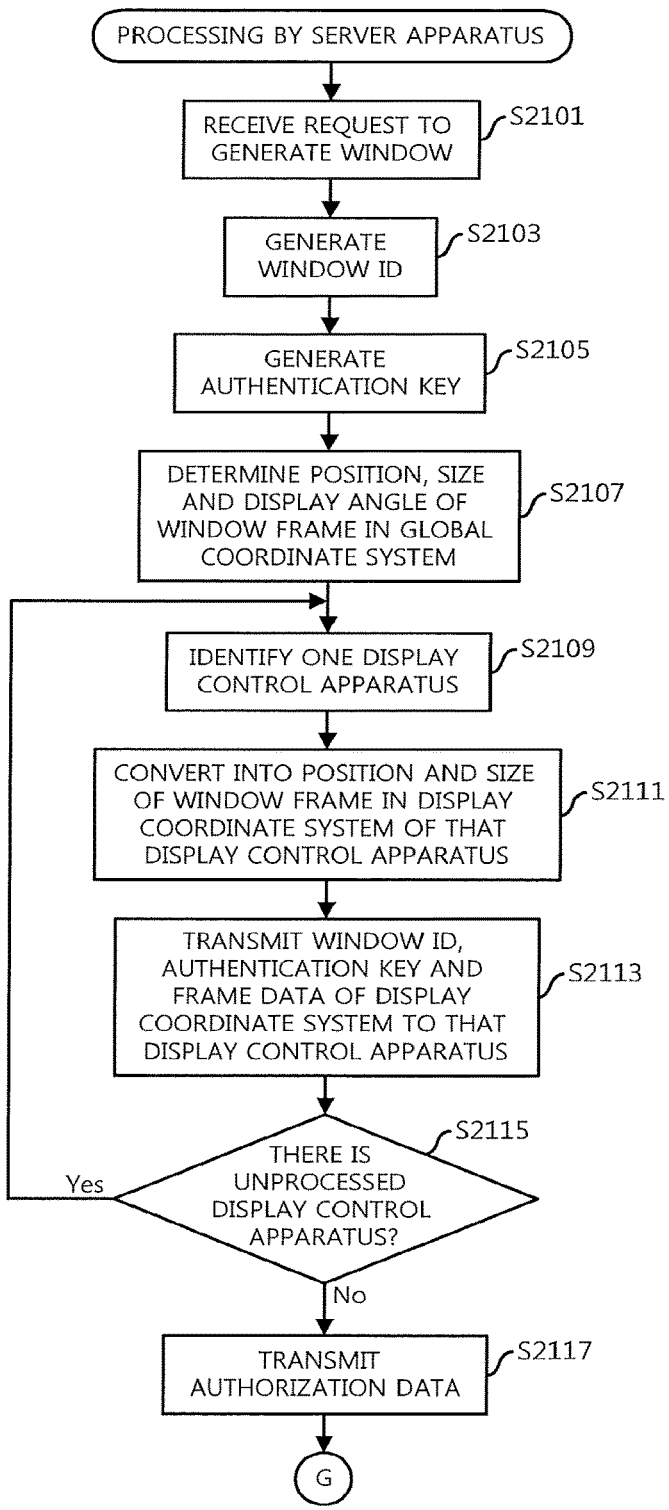
FIG. 21 is a diagram depicting an example of a processing flow for the server apparatus.

With reference to FIG. 20, a position of a window frame in the display coordinate system of the second display control apparatus 203 will be explained. As described above, the display coordinate system of the second display control apparatus 203 means the display coordinate system of the right display surface 107 illustrated in FIG. 1. The width of the right display surface 107 is 2000 (dots), and the height of the right display surface 107 is 3000 (dots). A reference point of the window frame (in this example, the upper-left end point of the window frame) for displaying the contents image 109 corresponds to a position (−1000, 500) in the display coordinate system of the second display control apparatus 203. A lower-right end point of the window frame displaying the contents image 109 corresponds to a position (1000, 2500) in the display coordinate system of the second display control apparatus 203.

Next, the processing in the server apparatus 205 will be explained. FIGS. 21 to 24 illustrate examples of processing flows for the server apparatus 205. The processing illustrated in FIGS. 21 to 24 is activated when a request to generate a window is received from the client terminal 101. Then, when the generated window is deleted, this processing ends. In addition, when plural windows are generated, processing corresponding to respective window is executed in parallel.

When the second reception unit 1301 receives a request to generate a window from the client terminal 101 (S2101), the generator 1303 generates a window ID (S2103). The generated window ID is different from the existing window ID. Namely, the window ID is unique.

Next, the generator 1303 generates an authentication key corresponding to the window ID (S2105). The generated authentication key is different from the existing authentication key. Namely, the authentication key is unique. The generator 1303 stores the authentication key generated in S2105 in the authentication data storage unit 1319 in association with the window ID generated in S2103. Specifically, the window ID and the authentication key are set in a new record of the authentication data.

Incidentally, when the authentication of the client terminal 101 is omitted, the authentication key may not be generated. In this case, the generator 1303 stores the window ID generated in S2103 in the authentication data storage unit 1319.

The determination unit 1305 determines a position, size and a display angle of the window frame in the global coordinate system (S2107). As described above, the method for determining the position, size and display angle in the global coordinate system is arbitrary. For example, the determination unit 1305 may use a predetermined position, predetermined size and a predetermined display angle. Moreover, the determination unit 1305 may determine the position, size and display angle of a new window frame so as not to overlap with the existing window frame. The position, size and display angle of the window frame in the global coordinate system are set in the first record of the frame table.

The conversion unit 1307 identifies one display control apparatus based on the apparatus data (FIG. 14) (S2109). In this example, the conversion unit 1307 performs processing for the first display control apparatus 201 and processing for the second display control apparatus 203. When three or more display control apparatuses are used, the conversion unit 1307 performs the following processing for each of three or more display control apparatuses.

The conversion unit 1307 converts the position and size of the window frame in the global coordinate system into a position and size of the window frame in the display coordinate system of the display control apparatus (S2111). At this time, the conversion unit 1307 obtains the position of the window frame in the display coordinate system by affine transformation. In this example, the size of the window frame in the display coordinate system is equal to the size of the window frame in the global coordinate system. However, when a pixel density in the display coordinate system is different from a pixel density in the global coordinate system, the conversion unit 1307 may multiply the size of the window frame in the global coordinate system by a ratio of the pixel density to calculate the size of the window frame in the display coordinate system. The conversion unit 1307 may calculate the size of the window frame based on the result of the affine transformation.

Simply, the conversion unit 1307 may calculate an X coordinate of the position of the window frame in the display coordinate system by subtracting an X coordinate of the position of the origin from an X coordinate of the position of the window frame in the global coordinate system. Similarly, the conversion unit 1307 may calculate a Y coordinate of the position of the window frame in the display coordinate system by subtracting a Y coordinate of the position of the origin from a Y coordinate of the position of the window frame in the global coordinate system.

In this example, since the position of the origin concerning the first display control apparatus 201 is (0, 0) as illustrated in FIG. 14, the position of the window frame in the display coordinate system of the first display control apparatus 201 is the same as the position of the window frame in the global coordinate system, as illustrated in FIG. 17. Similarly, since the position of the origin concerning the second display control apparatus 203 is (2000, 0), the X coordinate of the position of the window frame in the display coordinate system of the second display control apparatus 203 is a value calculated by subtracting 2000 from the X coordinate of the position of the window frame in the global coordinate system. On the other hand, the Y coordinate of the position of the window frame in the display coordinate system of the second display control apparatus 203 is the same as the Y coordinate of the position of the window frame in the global coordinate system. Incidentally, the calculation of the position by affine transformation and the calculation of the size based on the ratio of the pixel density are according to the prior art.

The display angle of the window frame in the display coordinate system is the same as the display angle of the window frame in the global coordinate system. As described above, the position, size and display angle of the window frame in the display coordinate system of the display control apparatus identified in S2109 are set in the second record or the third record of the frame table.

The second transmission unit 1309 transmits the window ID generated in S2103, the authentication key generated in S2105, and the frame data of the display coordinate system obtained in S2111 to the display control apparatus identified in S2109 (S2113). At this time, an IP address that is the destination display control apparatus is identified based on the apparatus data.

The conversion unit 1307 determines whether or not there is an unprocessed display control apparatus (S2115). When it is determined that there is an unprocessed display control apparatus, the processing returns to S2109, and the aforementioned processing is repeated.

When it is determined that there is no unprocessed display control apparatus, the second transmission unit 1309 transmits authorization data to the client terminal 101 (S2117). The authorization data includes the window ID generated in S2103, the authentication key generated in S2105, the IP address of the first display control apparatus 201 set in a record of the apparatus data, and the IP address of the second display control apparatus 203. Then, via the terminal G, the process of S2201 illustrated in FIG. 22 is performed.

Figure 22:
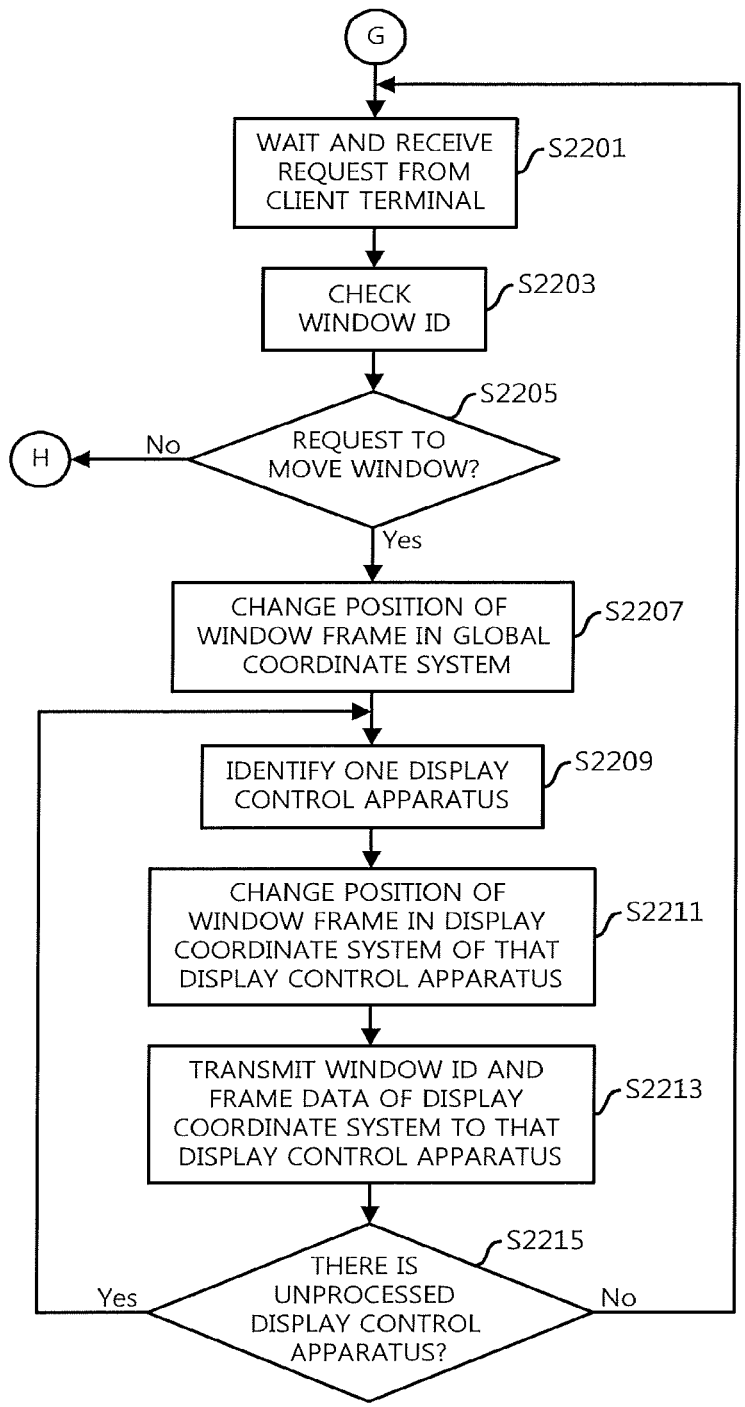
FIG. 22 is a diagram depicting an example of a processing flow for the server apparatus.

Shifting to an explanation of FIG. 22, the second reception unit 1301 waits and receives plural types of requests from the client terminal 101 (S2201). When receiving a request from the client terminal 101, the first check unit 1311 checks the window ID included in the request (S2203). Specifically, the first check unit 1311 determines whether or not the window ID included in the request matches any one of the window IDs included in the authentication data. When it is determined that the window ID included in the request matches any one of the window IDs included in the authentication data, the check result is normal. When it is determined that the window ID included in the request does not match any of the window IDs included in the authentication data, the check result is an error. If the check result is an error, the second transmission unit 1309 transmits to the client terminal 101 that the check result is an error, and returns to the processing illustrated in S2201.

When the check result is normal, the change unit 1313 determines whether or not the request received in S2201 is a request to move a window (S2205). When it is determined that the request received in S2201 is a request to move a window, the change unit 1313 changes the position of the window frame in the global coordinate system based on a movement vector included in the request to move the window (S2207). Specifically, the change unit 1313 adds an X-component of the movement vector to the X coordinate of the position set in the first record of the frame table, and adds a Y-component of the movement vector to the Y coordinate of the position.

Next, the change unit 1313 identifies one display control apparatus based on the apparatus data (FIG. 14) (S2209). In this example, the change unit 1313 performs processing for the first display control apparatus 201 and processing for the second display control apparatus 203. When three or more display control apparatuses are used, the change unit 1313 performs the following processing for each of three or more display control apparatuses.

The change unit 1313 changes the position of the window frame in the display coordinate system of the display control apparatus identified in S2209, based on the position of the window frame in the global coordinate system, which was changed in S2207 (S2211). The position of the window frame in the display coordinate system of the display control apparatus is calculated, as described above, by the affine transformation of the position of the window frame in the global coordinate system. According to the affine transformation, even when a pixel density in the global coordinate system is different from a pixel density in the display coordinate system, the position of the window frame in the display coordinate system of the display control apparatus is calculated according to the difference in pixel density.

The second transmission unit 1309 transmits the window ID included in the request to move the window and the frame data of the display coordinate system of the display control apparatus identified in S2209 to the display control apparatus (S2213). At this time, an IP address of the destination display control apparatus is identified based on the apparatus data.

The change unit 1313 determines whether or not there is an unprocessed display control apparatus (S2215). When it is determined that there is an unprocessed display control apparatus, the processing returns to S2209 and the aforementioned processing is repeated. When it is determined that there is no unprocessed display control apparatus, the processing returns to S2201 and the aforementioned processing is repeated.

Figure 23:
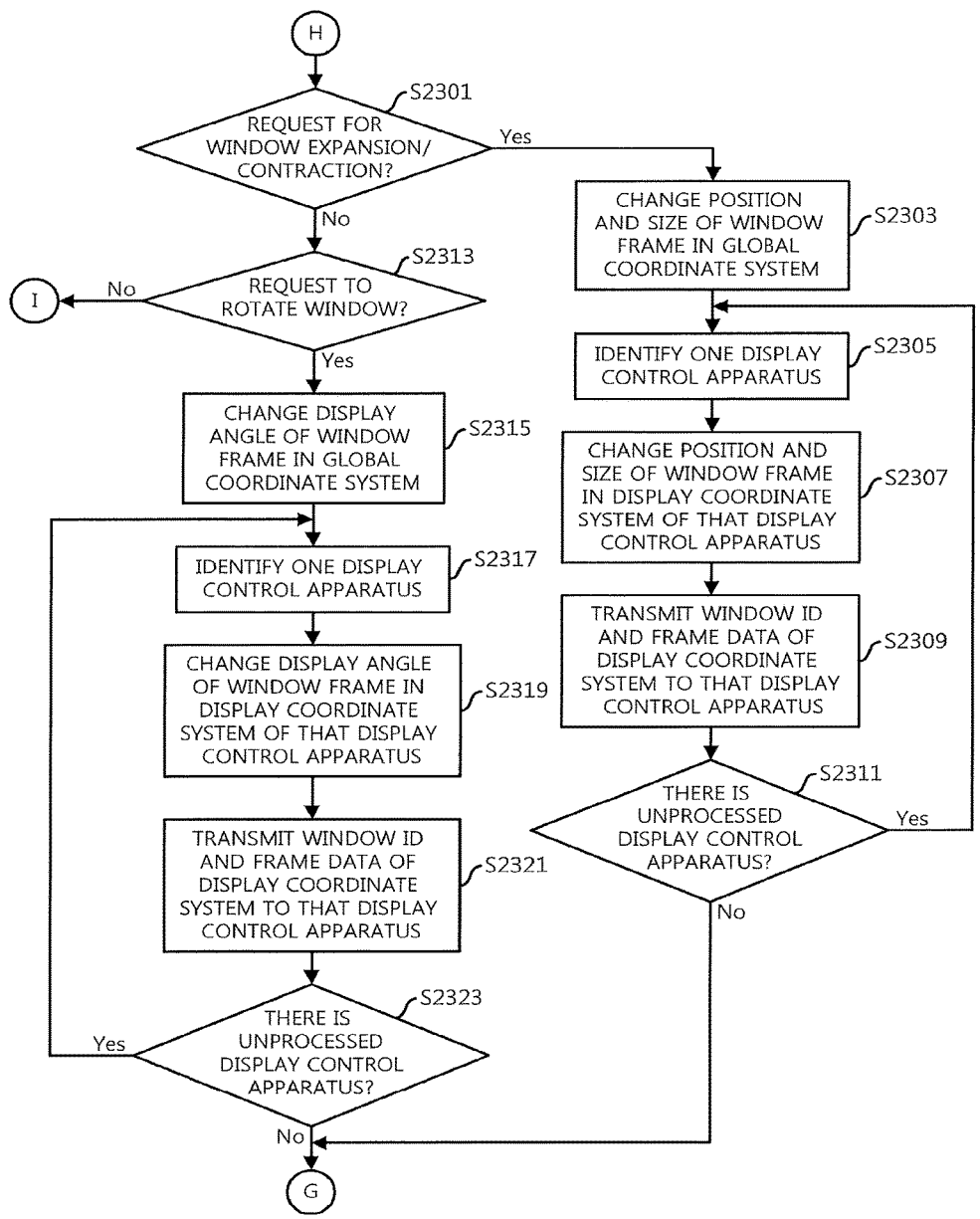
FIG. 23 is a diagram depicting an example of a processing flow for the server apparatus.

Returning to the explanation of the processing in S2205, when it is determined in S2205 that the request received in S2201 is not a request to move a window, the processing shifts to S2301 illustrated in FIG. 23 via terminal H.

Shifting to an explanation of FIG. 23, the change unit 1313 determines whether or not the request received in S2201 of FIG. 22 is a request for the window expansion/contraction (S2301). When it is determined that the request received in S2201 of FIG. 22 is a request for the window expansion/contraction, the change unit 1313 changes the position and size of the window frame in the global coordinate system based on the expansion/contraction rate included in the request for the window expansion/contraction (S2303).

In the case of a method of expanding or contracting by fixing an upper-left end point of a window frame, the position of the window frame is not changed. A change unit 1313 calculates new width by multiplying the width of the size of the window frame by the expansion/contraction rate. Furthermore, the change unit 1313 calculates new height by multiplying the height of the size of the window frame by the expansion/contraction rate.

In the case of a method of expanding or contracting by fixing a center of gravity of a window frame, the change unit 1313 calculates new width by multiplying the width of the size of the window frame by the expansion/contraction rate. Furthermore, the change unit 1313 calculates new height by multiplying the height of the size of the window frame by the expansion/contraction rate. Then, the change unit 1313 subtracts half of an amount of change of the width from the X coordinate of the position of the window frame. Furthermore, the change unit 1313 subtracts half of the amount of change of the height from the Y coordinate of the position of the window frame. The position and size of the window frame in the global coordinate system may be calculated by other methods.

Next, the change unit 1313 identifies one display control apparatus based on the apparatus data (FIG. 14), as in the case of S2209 illustrated in FIG. 22 (S2305).

The change unit 1313 changes the position and size of the window frame in the display coordinate system of the display control apparatus identified in S2305, based on the position and size of the window frame in the global coordinate system, which were changed in S2303 (S2307). The position of the window frame in the display coordinate system of the display control apparatus is calculated, as described above, by the affine transformation of the position of the window frame in the global coordinate system. The size of the window frame in the display coordinate system is the same as the size of the window frame in the global coordinate system. Moreover, the display angle of the window frame in the display coordinate system is not changed.

The second transmission unit 1309 transmits the window ID included in the window expansion/contraction request and the frame data of the display coordinate system of the display control apparatus to the display control apparatus, as in the processing of S2213 illustrated in FIG. 22 (S2309).

The change unit 1313 determines whether or not there is an unprocessed display control apparatus (S2311). When it is determined that there is an unprocessed display control apparatus, the processing returns to S2305, and the aforementioned processing is repeated. When it is determined that there is no unprocessed display control apparatus, the processing returns to S2201 via terminal G, and the aforementioned processing is repeated.

Returning to the explanation of the processing in S2301, when it is determined in S2301 that the request received in S2201 of FIG. 22 is not the window expansion/contraction request, the change unit 1313 determines whether or not the request received in S2201 of FIG. 22 is a request to rotate a window (S2313).

When determining that the request received in S2201 of FIG. 22 is a request to rotate a window, the change unit 1313 changes a display angle of the window frame in the global coordinate system based on a rotation angle included in the request to rotate the window (S2315). Specifically, the change unit 1313 calculates a new display angle by adding the rotation angle to the display angle of the window frame in the global coordinate system. The position and size of the window frame in the global coordinate system are not changed.

Next, the change unit 1313 identifies one display control apparatus based on the apparatus data (FIG. 14) (S2317), as in the case of S2209 illustrated in FIG. 22.

The change unit 1313 changes the display angle of the window frame in the display coordinate system of the display control apparatus identified in S2317 based on the display angle of the window frame in the global coordinate system, which was changed in S2315 (S2319). The display angle of the window frame in the display coordinate system of the display control apparatus is the same as the display angle of the window frame in the global coordinate system. The position and size of the window frame in the display coordinate system are not changed.

The second transmission unit 1309 transmits the window ID included in the request to rotate the window and the frame data of the display coordinate system of the display control apparatus to the display control apparatus, as in the processing of S2213 illustrated in FIG. 22 (S2321).

The change unit 1313 determines whether or not there is an unprocessed display control apparatus (S2323). When it is determined that there is an unprocessed display control apparatus, the processing returns to S2317, and the aforementioned processing is repeated. When it is determined that there is no unprocessed display control apparatus, the processing returns to S2201 via the terminal G, and the aforementioned processing is repeated.

Figure 24:
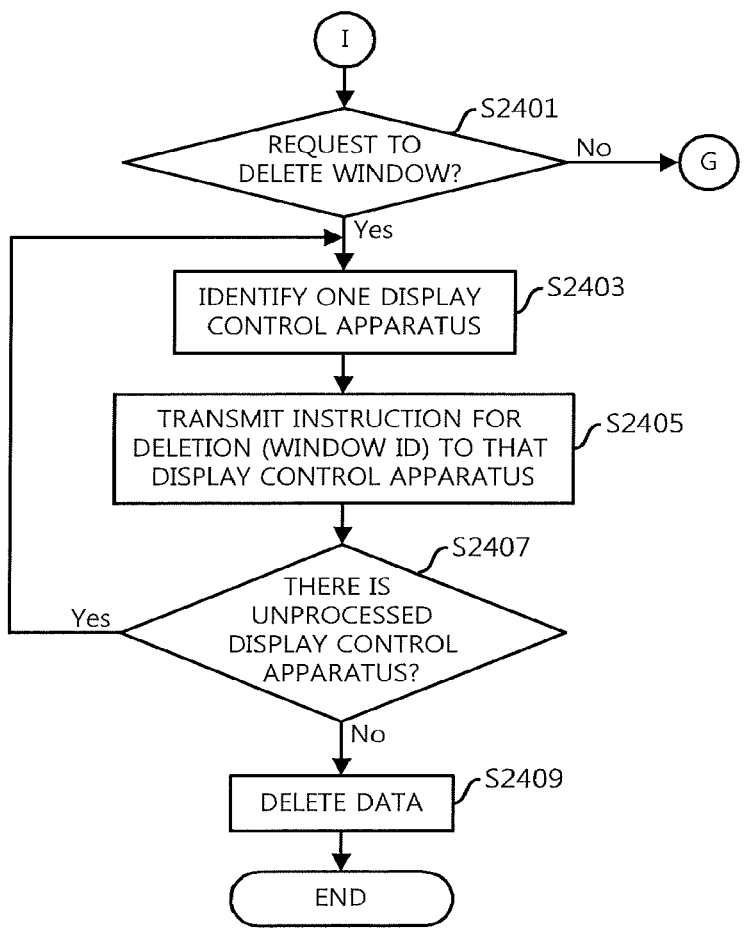
FIG. 24 is a diagram depicting an example of a processing flow for the server apparatus.

Returning to the explanation of the processing in S2313, when it is determined in S2313 that the request received in S2201 of FIG. 22 is not a request to rotate a window, the processing shifts to S2401 illustrated in FIG. 24 via terminal I.

Shifting to an explanation of FIG. 24, the second deletion unit 1315 determines whether or not the request received in S2201 of FIG. 22 is a request to delete a window (S2401). When it is determined that the request received in S2201 of FIG. 22 is a request to delete a window, the second deletion unit 1315 identifies, based on the apparatus data (FIG. 14), one display control apparatus as in the case of S2209 illustrated in FIG. 22 (S2403).

The second transmission unit 1309 identifies a window ID included in the request to delete the window, and transmits an instruction to delete a window including the window ID to the identified display control apparatus (S2405). The second deletion unit 1315 determines whether or not there is an unprocessed display control apparatus (S2407). When it is determined that there is an unprocessed display control apparatus, the processing returns to S2403 and the aforementioned processing is repeated.

When it is determined that there is no unprocessed display control apparatus, the second deletion unit 1315 deletes data relating to the window ID included in the request to delete the window (S2409). Specifically, the second deletion unit 1315 deletes, among records of the authentication data, a record in which the window ID included in the request to delete the window is set. Furthermore, the second deletion unit 1315 deletes a frame table corresponding to the window ID as well. Then, the processing of the server apparatus 205 ends.

Returning to the explanation of the processing in S2401, when it is determined in S2401 that the request received in S2201 in FIG. 22 is not a request to delete a window, the request is regarded as an invalid request, and the processing returns to S2201 of FIG. 22 by way of terminal G. The explanation for the operation of the server apparatus 205 ends.

Next, an operation of the display control apparatus will be explained. Hereinafter, the first display control apparatus 201 will be explained, but the same applies to other display control apparatuses, for example, the second display control apparatus 203.

Figure 25:
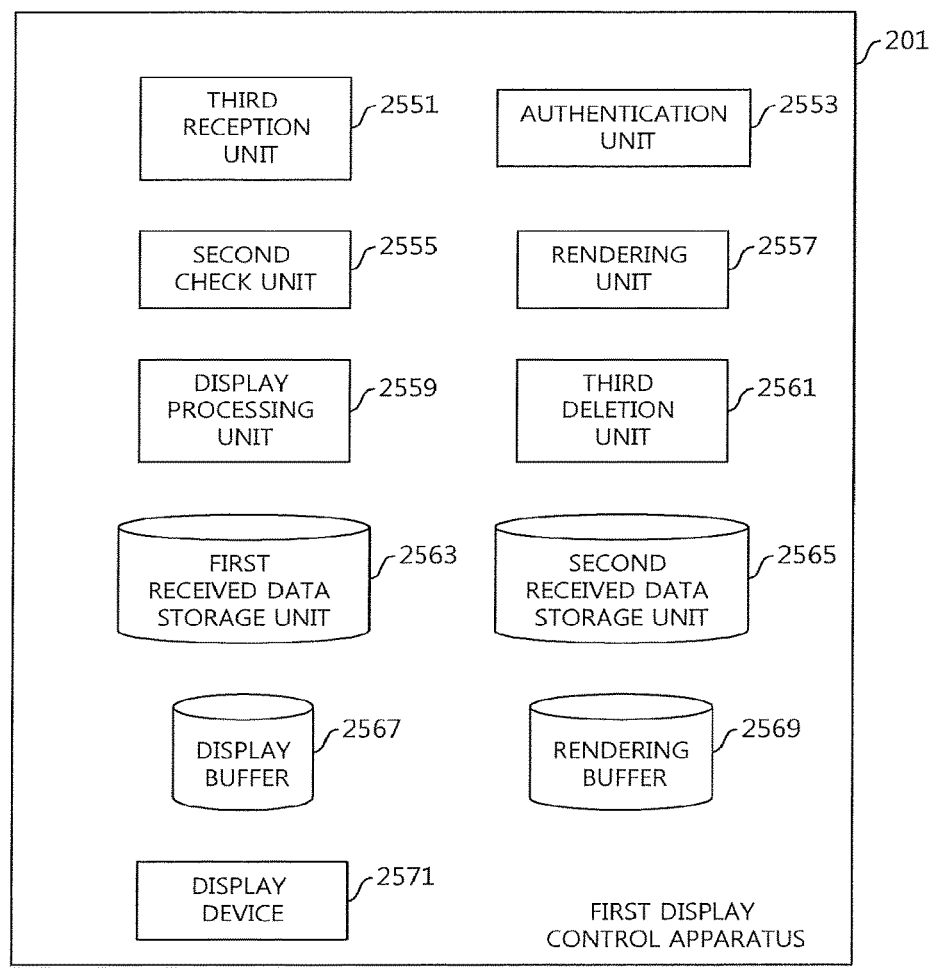
FIG. 25 is a diagram depicting an example of a module configuration of the first display control apparatus.

FIG. 25 illustrates an example of a module configuration of the first display control apparatus 201. The first display control apparatus 201 includes a third reception unit 2551, an authentication unit 2553, a second check unit 2555, a rendering unit 2557, a display processing unit 2559, a third deletion unit 2561, a first received data storage unit 2563, a second received data storage unit 2565, a display buffer 2567, a rendering buffer 2569, and a display device 2571.

The third reception unit 2551 receives plural types of data from the client terminal 101 and the server apparatus 205. The authentication unit 2553 authenticates the client terminal 101. The second check unit 2555 checks a window ID received from the client terminal 101. The rendering unit 2557 renders the contents image 109 in a window frame based on the contents data 103 and frame data. The display processing unit 2559 causes the display device 2571 to display the contents image 109 rendered in the window frame. The third deletion unit 2561 deletes unnecessary data. The first received data storage unit 2563 stores first received data that has been received from the server apparatus 205. The second received data storage unit 2565 stores second received data that has been received from the client terminal 101. The display buffer 2567 holds image data to be displayed on a display surface. The display buffer 2567 may have plural layers. A rendering buffer 2569 is used for rendering the contents image 109. The display device 2571 is, for example, a liquid crystal display, a plasma display or a projector.

The aforementioned third reception unit 2551, authentication unit 2553, second check unit 2555, rendering unit 2557, display processing unit 2559, and the third deletion unit 2561 are realized by using hardware resources (for example, FIG. 32) and a program that causes a processor to execute processing described below.

The aforementioned first received data storage unit 2563, second received data storage unit 2565, display buffer 2567, and rendering buffer 2569 are realized by using hardware resources (for example, FIG. 32).

Next, the first received data stored in the first received data storage unit 2563 will be explained. FIG. 26 illustrates an example of the first received data. The first received data in this example is in a table format. However, the first received data may be in a format other than the table format.

The first received data in this example has records corresponding to window IDs. A record of the first received data includes a field for setting a window ID, a field for setting an authentication key, a field for setting a position of a window frame in the display coordinate system, a field for setting the size of the window frame as well, and a field for setting a display angle of the window frame as well. The position of the window frame is identified by the X coordinate and the Y coordinate of a reference point of the window frame. In this example, the upper-left endpoint of the window frame is the reference point. The size of the window frame is identified by the width and the height.

The first record in this example represents that the authentication key "xxxx" corresponds to the window ID "W1". Furthermore, the first record in this example represents that a frame is set so that the reference point of the window frame identified by the window ID "W1" corresponds to the position (1000, 500) in the display coordinate system. Furthermore, the first record in this example represents that the width of the frame is "2000" and the height is "2000". Further, the first record in this example represents that the frame is set so that the display angle becomes "0". In a case where plural windows are generated, plural records are provided.

Next, the second received data stored in the second received data storage unit 2565 will be explained. FIG. 27 illustrates an example of the second received data. The second received data in this example is in a table format. However, the second received data may be in a format other than the table format.

The second received data in this example has records corresponding to window IDs. The record of the second received data has a field for setting a window ID, a field for storing a HTML file, and a field for storing a CSS file. In the record, names of the HTML file and the CSS file may be set, and the HTML file and the CSS file may be stored in a different area.

The first record in this example represents that data of content to be displayed in the window identified by the window ID "W1" is the HTML file "a.html" and the CSS file "a.css".

Figure 28:
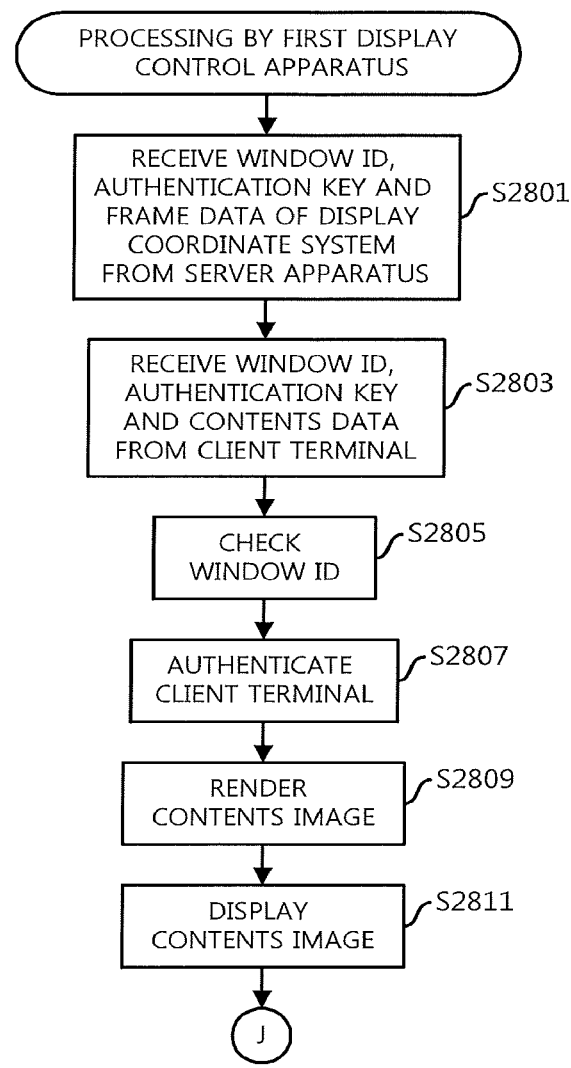
FIG. 28 is a diagram depicting an example of a processing flow for the first display control apparatus.
Figure 29:
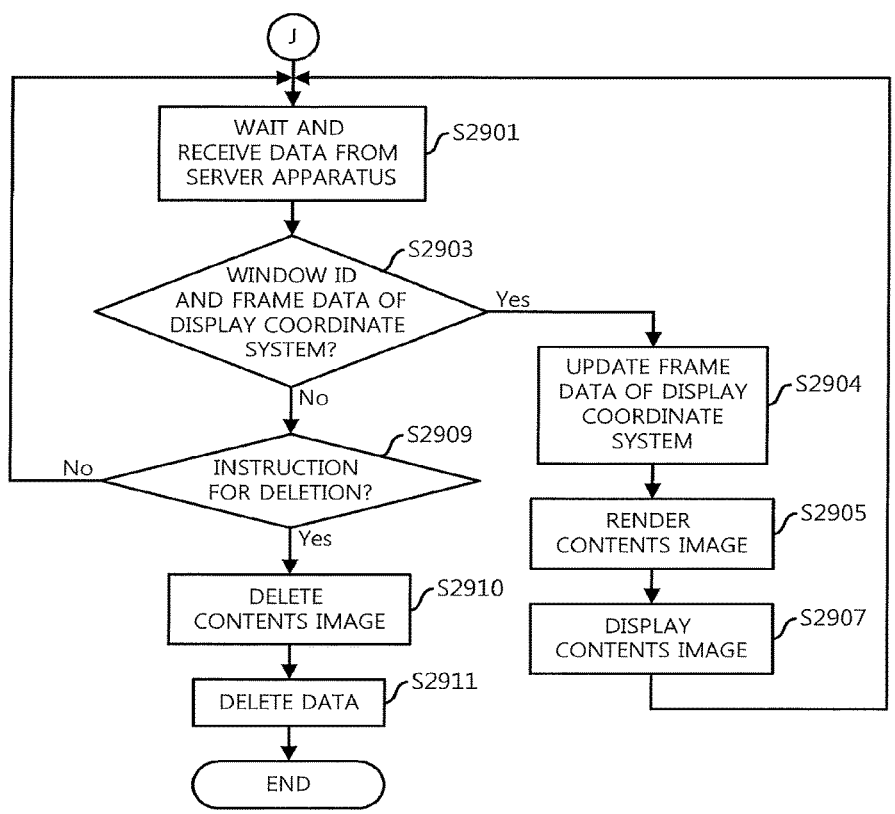
FIG. 29 is a diagram depicting an example of a processing flow for the first display control apparatus.

Next, processing by the display control apparatus will be explained using an example of the first display control apparatus 201. FIG. 28 and FIG. 29 illustrate an example of the processing flow for the first display control apparatus 201. Here, the processing of the first display control apparatus 201 will be explained. However, the processing is carried out in another display control apparatus as well, for example, in the second display control apparatus 203. The processing illustrated in FIGS. 28 and 29 is activated when a window ID, an authentication key, and frame data of the display coordinate system are received from the server apparatus 205. Then, this processing ends when the generated window is deleted. In addition, when plural windows are generated, processing corresponding to respective windows is executed in parallel.

When the third reception unit 2551 receives a window ID, a authentication key and frame data of the display coordinate system from the server apparatus 205 (S2801), the third reception unit 2551 stores the received window ID, authentication key and frame data of the display coordinate system in the first received data storage unit 2563.

Next, the third reception unit 2551 receives a window ID, an authentication key and the contents data 103 from the client terminal 101 (S2803), and stores the received window ID and the contents data 103 in the second received data storage unit 2565. Incidentally, in the case where data is not received from the client terminal 101 within a predetermined period from a time when data is received from the server apparatus 205 in S2801, the processing of the first display control apparatus 201 may be interrupted.

Then, the second check unit 2555 checks the window ID received from the client terminal 101 (S2805). Specifically, the second check unit 2555 determines whether or not the window ID received from the client terminal 101 matches the window ID received from the server apparatus 205 in S2801. When it is determined that the window ID received from the client terminal 101 matches the window ID received from the server apparatus 205, the check result is normal. When it is determined that the window ID received from the client terminal 101 does not match the window ID received from the server apparatus 205, the check result is an error. When the check result is an error, the first display control apparatus 201 interrupts the processing. At this time, the first display control apparatus 201 deletes the data stored in the first received data storage unit 2563 and the data stored in the second received data storage unit 2565.

When the check result is normal, the authentication unit 2553 authenticates the client terminal 101 (S2807). Specifically, it is determined whether or not the authentication key received from the client terminal 101 in S2803 matches the authentication key received from the server apparatus 205 in S2801. When the authentication key received from the client terminal 101 matches the authentication key received from the server apparatus 205, the authentication has succeeded. When the authentication key received from the client terminal 101 does not match the authentication key received from the server apparatus 205, the authentication has failed. When the authentication of the client terminal 101 has failed, the first display control apparatus 201 interrupts the processing. At this time, the first display control apparatus 201 deletes the data stored in the first received data storage unit 2563 and the data stored in the second received data storage unit 2565.

Incidentally, the authentication of the client terminal 101 in S2807 may be omitted. In that case, it is assumed that the validity of the client terminal 101 is guaranteed, since the check result in S2805 is normal. That is, the check of the window ID also serves as authentication of the client terminal 101.

The rendering unit 2557 renders the contents image 109 in the window frame based on the contents data 103 stored in the second received data storage unit 2565 and the frame data stored in the first received data storage unit 2563 (S2809). Specifically, the rendering unit 2557 analyzes the HTML file included in the contents data 103, and renders each part included in the contents image 109 in the rendering buffer 2569 according to the CSS file included in the contents data 103. The rendering unit 2557 copies all or a part of the contents image 109 rendered in the rendering buffer 2569 to the display buffer 2567 according to the frame data. Alternatively, the rendering unit 2557 may render the contents image 109 directly on the display buffer 2567 based on the contents data 103 stored in the second received data storage unit 2565 and the frame data stored in the first received data storage unit 2563.

Then, the display processing unit 2559 causes the display device 2571 to display the contents image 109 copied to the display buffer 2567 (S2811). At this time, the display processing unit 2559 may redisplay the entire display surface, or may superimpose the contents image 109 corresponding to the upper layer on the background. In either method, the contents image 109 located outside the display surface is ignored. Then, the processing shifts to S2901 illustrated in FIG. 29 via terminal J. The rendering unit 2557 and the display processing unit 2559 may be realized by using a browser and a program that operates on the browser (for example, a script).

Shifting to an explanation of FIG. 29, the third reception unit 2551 waits and receives data from the server apparatus 205 (S2901). The third reception unit 2551 determines whether or not the received data is a window ID and frame data of the display coordinate system (S2903).

When it is determined that the received data is a window ID and frame data of the display coordinate system, the rendering unit 2557 updates the frame data of the display coordinate system (S2904). Specifically, the rendering unit 2557 identifies a record in which the received window ID is set, from records of the first received data. Then, the rendering unit 2557 rewrites the frame data of the display coordinate system set in the identified record to the frame data of the received display coordinate system.

The rendering unit 2557 renders the contents image 109 in a window frame (S2905) as well as the processing in S2809. The display processing unit 2559 causes the display device 2571 to display the contents image 109 rendered in the window frame (S2907) as well as the processing of S2811. At this time, the display processing unit 2559 may redisplay the entire display surface, or may redisplay the contents image 109 corresponding to the upper layer. Then, the processing returns to the aforementioned processing of S2901, and the aforementioned processing is repeated.

On the other hand, when it is determined that the data received in S2901 is not a window ID and frame data of the display coordinate system, the third deletion unit 2561 determines whether or not the data received in S2901 is a deletion instruction (S2909).

When it is determined in S2901 that the received data is the deletion instruction, the display processing unit 2559 deletes the contents image 109 in the window frame identified by the window ID (S2910). Specifically, the display processing unit 2559 redisplays the entire display surface except for the contents image 109 corresponding to the upper layer. Furthermore, the third deletion unit 2561 deletes data relating to the window ID included in the deletion instruction (S2911). Specifically, the third deletion unit 2561 deletes a record in which the window ID included in the deletion instruction is set, from among records of the first received data. Furthermore, the third deletion unit 2561 deletes a record in which the window ID included in the deletion instruction is set, from among records of the second received data. When it is determined in S2909 that the data received in S2901 is not the deletion instruction, it is regarded as invalid data, and the processing returns to the processing illustrated in S2901. The explanation for the operation of the display control apparatus ends.

This embodiment enables to distribute loads relating to processing to display contents in a multi-display system. In this example, since the display control apparatus performs rendering processing, the processing load on the client terminal 101 and the server apparatus 205 is reduced.

Furthermore, since the contents data 103 including the HTML file and the CSS file is transmitted, it is possible to suppress an amount of transmission data as compared with a case of transmitting the image data.

Furthermore, since the window ID is checked, it is possible to detect a provision of contents from an unauthorized terminal.

Furthermore, it is possible to interlock positions and/or size of windows in respective display surfaces.

Furthermore, it is possible to interlock display angles of windows on respective display planes.

Embodiment 2

In the aforementioned embodiment, an example in which a user's operation relating to a window is accepted in the client terminal 101 has been explained. In this embodiment, an example in which a user's operation relating to a window is accepted in the display control apparatus will be explained. Hereinafter, the first display control apparatus 201 will be explained, but the same applies to other display control apparatuses, for example, the second display control apparatus 203.

Figure 30:
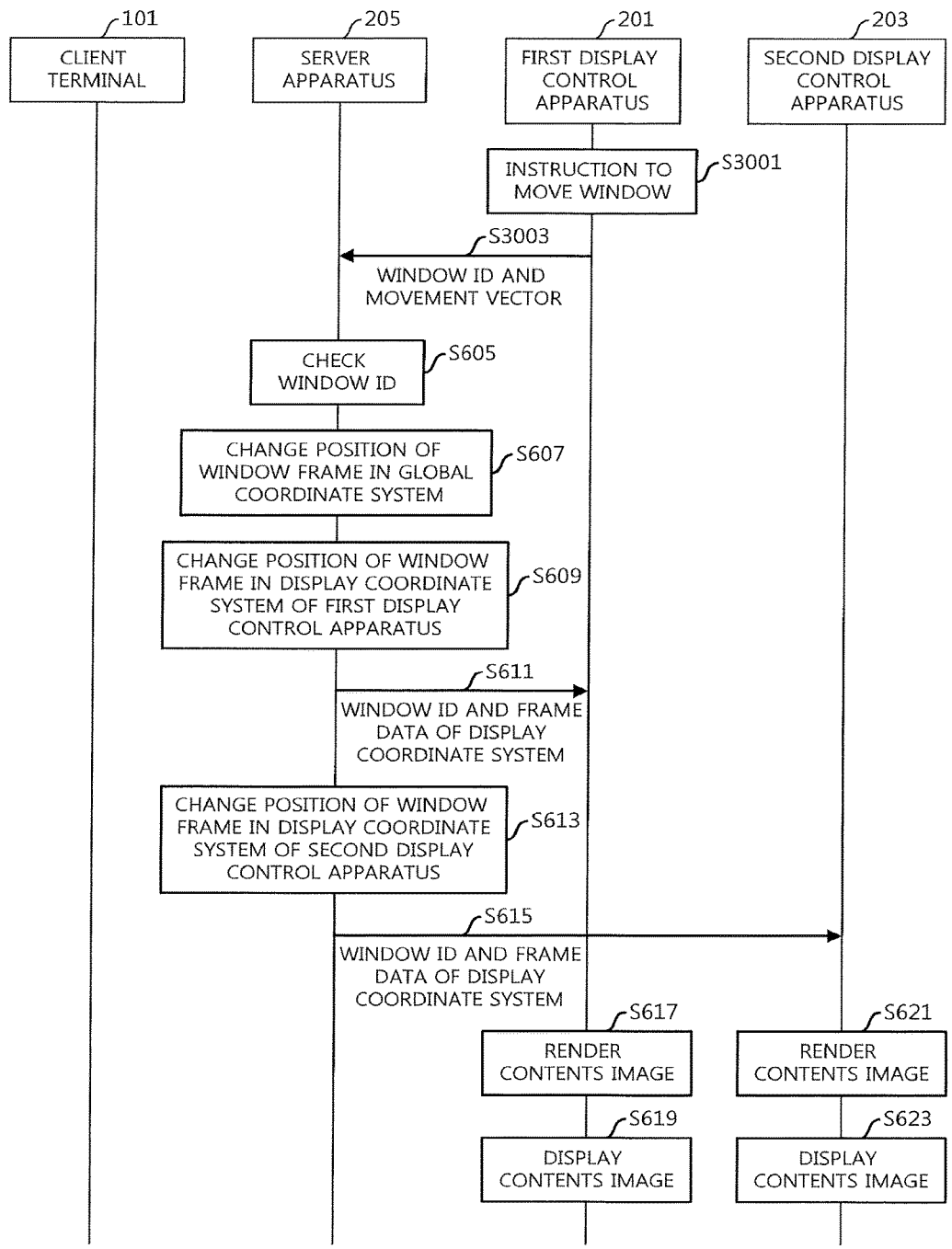
FIG. 30 is a diagram depicting an example of a sequence of window movement relating a second embodiment.

FIG. 30 illustrates an example of a sequence of window movement according to the second embodiment. In this example, it is assumed that the first display control apparatus 201 has a user interface (for example, a touch pad installed on a display surface) for accepting a user's instruction. The first display control apparatus 201 accepts an instruction to move a window using the user interface of the display control apparatus (S3001). At this time, the first display control apparatus 201 identifies the window to be moved based on, for example, a relationship between a window frame and a touch position. Then, the first display control apparatus 201 calculates a movement vector based on, for example, a direction and a distance of sliding of the touch position. The first display control apparatus 201 transmits a request to move a window, which includes a window ID that identifies a window to be moved and a movement vector, to the server apparatus 205 (S3003). The subsequent processing of S605 to S623 is the same as in the case of FIG. 6.

Similarly, the first display control apparatus 201 may accept an instruction for the window expansion/contraction. The expansion/contraction rate may be calculated in the first display control apparatus 201. The first display control apparatus 201 may transmit a request for the window expansion/contraction, which includes a window ID identified as described above and an expansion/contraction rate, to the server apparatus 205.

Similarly, the first display control apparatus 201 may accept an instruction to rotate a window. The rotation angle may be calculated in the first display control apparatus 201. The first display control apparatus 201 may transmit a request to rotate a window, which includes a window ID identified as described above and a rotation angle, to the server apparatus 205.

Similarly, the first display control apparatus 201 may accept an instruction to delete a window. The first display control apparatus 201 may transmit a request to delete a window, which includes a window ID identified as described above, to the server apparatus 205.

In this embodiment, the user is able to operate a window from the display control apparatus.

Although the embodiments of this invention were explained above, this invention is not limited to those. For example, the aforementioned functional block configuration does not always correspond to actual program module configuration.

Moreover, the aforementioned configuration of each storage area is a mere example, and may be changed. Furthermore, as for the processing flow, as long as the processing results do not change, the turns of the steps may be exchanged or the steps may be executed in parallel.

FIG. 31 illustrates an example of a hardware configuration of the client terminal 101. The client terminal 101 has a processor 3101, a storage unit 3103, an antenna 3111, a wireless controller 3113, an audio controller 3115, a speaker 3117, a microphone 3119, a display 3121, a touch pad 3123, a camera 3125, and a GPS device 3127.

The processor 3101 may be composed of a modem CPU (Central Processing Unit) and an application CPU. The storage unit 3103 has, for example, a ROM (Read Only Memory) 3105, a RAM (Random Access Memory) 3107, and a flash memory 3109. The ROM 3105 stores, for example, preset data and programs. The RAM 3107 includes, for example, an area for loading a program or data such as an application. The flash memory 3109 stores programs such as an operating system and applications, for example, and stores data as appropriate.

The touch pad 3123 is, for example, a panel-shaped sensor arranged on a display surface of the display 3121 and accepts a touch operation. The display 3121 displays, for example, plural types of screens displayed by the application. Specifically, it is used as a touch panel that integrates the display 3121 and the touch pad 3123. A touch event occurs in response to a touch operation on the touch pad 3123. In addition to the touch pad 3123, a key may be provided.

The antenna 3111 receives, for example, cellular wireless data. The wireless controller 3113 controls wireless communication. Voice communication and data communication of a telephone are performed by controlling wireless communication.

The audio controller 3115 performs analog/digital conversion and digital/analog conversion for sound data. Speaker 3117 outputs analog data as a sound. The microphone 3119 converts a sound into analog data.

The camera 3125 is used for taking moving pictures and photograph images. The GPS device 3127 measures a position.

In addition, the aforementioned first display control apparatus 201, second display control apparatus 203 and server apparatus 205 are computer apparatuses as illustrated in FIG. 32. That is, a memory 2501, a CPU 2503 (central processing unit), a HDD (hard disk drive) 2505, a display controller 2507 connected to a display device 2509, a drive device 2513 for a removable disk 2511, an input unit 2515, and a communication controller 2517 for connection with a network are connected through a bus 2519 as illustrated in FIG. 32. An operating system (OS) and an application program for carrying out the foregoing processing in the embodiments, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform predetermined operations. Moreover, intermediate processing data is stored in the memory 2501, and if necessary, it is stored in the HDD 2505. In these embodiments of this invention, the application program to realize the aforementioned processing is stored in the computer-readable, non-transitory removable disk 2511 and distributed, and then it is installed into the HDD 2505 from the drive device 2513. It may be installed into the HDD 2505 via the network such as the Internet and the communication controller 2517. In the computer apparatus as stated above, the hardware such as the CPU 2503 and the memory 2501, the OS and the application programs systematically cooperate with each other, so that various functions as described above in details are realized.

The aforementioned embodiments of this invention may be summarized as follows.

A display method relating to this embodiment includes: converting, by using an information processing apparatus and for each of plural display surfaces that are parts of an entire screen, a position and size of a window in a coordinate system of the entire screen into a position and size of the window in a coordinate system of the display surface according to arrangement of the plural display surfaces; transmitting, by using the information processing apparatus and for each of the plural display surfaces, the position and the size of the window in the coordinate system of the display surface to a display control apparatus that has a display device that provides the display surface; receiving, by using each of plural display control apparatuses, contents data from a terminal; and displaying, by using each of the plural display control apparatuses, an image rendered based on the received contents data according the received position and size of the window in the coordinate system of a display surface of the display control apparatus.

In this way, it is possible to distribute loads relating to contents display processing in a multi-display system.

The receiving may include: receiving the contents data that includes first data in which a configuration of contents is defined and second data in which a layout of the contents is defined, and the displaying may include rendering the image based on the first data and the second data.

This enables to hold down an amount of data to be received.

The transmitting may include transmitting a first identifier of the window to the display control apparatus, the receiving may include receiving, from the terminal, a second identifier that designates a window in which an image based on the contents data is to be displayed, and the display method may further include checking, by each of the plural display control apparatuses, the second identifier based on the first identifier.

In this way, it is possible to detect a provision of contents from an unauthorized terminal.

The display method may further includes: changing, by using the information processing apparatus and for each of the plural display surfaces, at least one of the position and the size of the window in the coordinate system of the display surface according to the arrangement of the plural display surfaces; and transmitting, by using the information processing apparatus and for each of the plural display surfaces, at least one of the changed position and size of the window in the coordinate system of the display surface, which has been changed in the changing, to the display control apparatus that has the display device that provides the display surface.

In this way, it is possible to interlock positions and/or size of the window in respective display surfaces.

The display method may further include: changing, by using the information processing apparatus and for each of the plural display surfaces, a display angle of the window; and transmitting, by using the information processing apparatus and for each of the plural display surfaces, the changed display angle to the display control apparatus that has the display device that provides the display surface.

In this way, it is possible to interlock display angles of the window in respective display surfaces.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A display method, comprising:
    converting, by using an information processing apparatus, a position and size of a first window in a coordinate system of an entire screen into a position and size of the first window in each of a plurality of coordinate systems of a plurality of display surfaces plurality of display control apparatuses, the image rendered based on the received contents data, according to the converted positions and sizes of the first window in the plurality of coordinate systems of the plurality of display surfaces.

2. The display method according to claim 1, wherein the receiving comprises receiving the contents data that includes first data in which a configuration of contents is defined and second data in which a layout of the contents is defined, and the displaying comprises rendering the image based on the first data and the second data.

3. The display method according to claim 1, further comprising:
    changing, by using the information processing apparatus and for each one of the plurality of display surfaces of the plurality of display control apparatuses, at least one of a converted position and size of the corresponding one of the converted positions and sizes of the first window in the plurality of coordinate systems of the plurality of display surfaces according to the arrangement of the plurality of display surfaces; and
    transmitting, by using the information processing apparatus, to each one of the plurality of display control apparatuses, a corresponding one of the changed positions and sizes of the first window in the plurality of coordinate systems of the plurality of display surfaces which has been changed in the changing.

4. The display method according to claim 1, further comprising:
    that are parts of the entire screen, according to arrangement of the plurality of display surfaces;
        transmitting, by using the information processing apparatus, to each one of a plurality of display control apparatuses each with a display device providing one of the plurality of display surfaces, a first identifier of the first window, a first authentication key of a first terminal that requested to display contents data, and a corresponding one of converted positions and sizes of the first window in the plurality of coordinate systems of the plurality of display surfaces, the first identifier and the first authentication key being associated with each other;
        receiving, by using each of the plurality of display control apparatuses and from a second terminal, the contents data, a second authentication key of the second terminal, and a second identifier of a second window in which an image that is to be rendered based on the contents data is to be displayed;
        determining, by using each of the plurality of display control apparatuses, whether the second identifier is identical to the first identifier;
        upon determining that the second identifier is identical to the first identifier, determining, by using each of the plurality of display control apparatuses, whether the second authentication key is identical to the first authentication key associated with the first identifier; and
        upon determining that the second authentication key is identical to the first authentication key associated with the first identifier, displaying, by using each of the
        changing, by using the information processing apparatus and for each one of the plurality of display surfaces of the plurality of display control apparatuses, a display angle of the first window; and
        transmitting, by using the information processing apparatus, to each one of the plurality of display control apparatuses, a corresponding one of the changed display angles of the first window.

* * * * *